(12) United States Patent
Ikariko

(10) Patent No.: US 6,918,829 B2
(45) Date of Patent: Jul. 19, 2005

(54) FIGHTING VIDEO GAME MACHINE

(75) Inventor: Masahiro Ikariko, Kadoma (JP)

(73) Assignee: Konami Corporation, Tokyo (JP)

( * ) Notice: Subject to any disclaimer, the term of this patent is extended or adjusted under 35 U.S.C. 154(b) by 172 days.

(21) Appl. No.: 09/923,941

(22) Filed: Aug. 7, 2001

(65) Prior Publication Data

US 2002/0022508 A1 Feb. 21, 2002

(30) Foreign Application Priority Data

Aug. 11, 2000 (JP) .................................. 2000-245253

(51) Int. Cl.[7] .................................................. A63F 9/24
(52) U.S. Cl. ........................ 463/5; 463/33; 463/35
(58) Field of Search .......................... 463/1, 2, 5, 7–8, 463/30–36, 47.2, 48–54; 381/1, 17, 61; 382/254, 276, 293, 307, 325; 345/7, 8, 706, 156, 158, 418, 501, 204; 340/500; 434/237, 238, 258, 307 R, 314, 365, 247

(56) References Cited

U.S. PATENT DOCUMENTS

| | | | | |
|---|---|---|---|---|
| 5,026,051 A | * | 6/1991 | Lowe et al. ................... | 463/35 |
| 5,248,150 A | * | 9/1993 | Koma ........................... | 463/5 |
| 5,603,507 A | * | 2/1997 | Tice ............................. | 473/29 |
| 5,616,078 A | | 4/1997 | Oh | |
| 5,754,660 A | * | 5/1998 | Shimizu ...................... | 381/17 |
| 5,768,393 A | * | 6/1998 | Mukojima et al. ............ | 381/17 |
| 5,782,639 A | * | 7/1998 | Beal ............................. | 434/29 |
| 5,853,324 A | * | 12/1998 | Kami et al. .................... | 463/2 |
| 5,862,229 A | | 1/1999 | Shimizu | |
| 5,946,400 A | * | 8/1999 | Matsuo ......................... | 381/17 |
| 5,976,017 A | * | 11/1999 | Omori et al. ................. | 463/32 |
| 5,980,254 A | * | 11/1999 | Muehle et al. ............... | 434/11 |
| 6,078,669 A | * | 6/2000 | Maher .......................... | 381/17 |
| 6,149,523 A | * | 11/2000 | Yamada et al. ............... | 463/31 |
| 6,206,783 B1 | * | 3/2001 | Yamamoto et al. ........... | 463/36 |
| 6,243,476 B1 | * | 6/2001 | Gardner ...................... | 381/303 |
| 6,251,011 B1 | * | 6/2001 | Yamazaki ..................... | 463/2 |
| 6,278,418 B1 | * | 8/2001 | Doi ............................... | 345/7 |
| 6,361,439 B1 | * | 3/2002 | Kawamoto .................... | 463/35 |
| 6,445,364 B2 | * | 9/2002 | Zwern ........................... | 345/8 |
| 2002/0022518 A1 | * | 2/2002 | Okuda et al. ................. | 463/36 |
| 2002/0036617 A1 | * | 3/2002 | Pryor ........................... | 345/156 |
| 2002/0065121 A1 | * | 5/2002 | Fukunaga et al. ............. | 463/8 |

FOREIGN PATENT DOCUMENTS

| | | |
|---|---|---|
| EP | 0943362 | 9/1999 |
| EP | 0952555 | 10/1999 |
| JP | 9-138637 | 5/1994 |
| JP | 08-221187 | 8/1996 |
| JP | 9-104398 | 4/1997 |
| JP | 10-244073 | 9/1998 |

* cited by examiner

Primary Examiner—Scott E. Jones
(74) Attorney, Agent, or Firm—Jordan and Hamburg LLP

(57) ABSTRACT

Loudspeakers 12 are arranged at left and right sides at an upper part of a game machine casing 10 provided with a monitor 11, and a loudspeaker 21 is arranged in the center of the front surface of the casing 10. A hitting sound made in a distant position is outputted as a sound effect from the loudspeakers 12, whereas a sound of a bullet hurtling through the air when the bullet passes in a near position is outputted as a sound effect from the loudspeaker 21. Accordingly, an acoustic presence in response to an attacking result from a game machine side can be given.

20 Claims, 16 Drawing Sheets

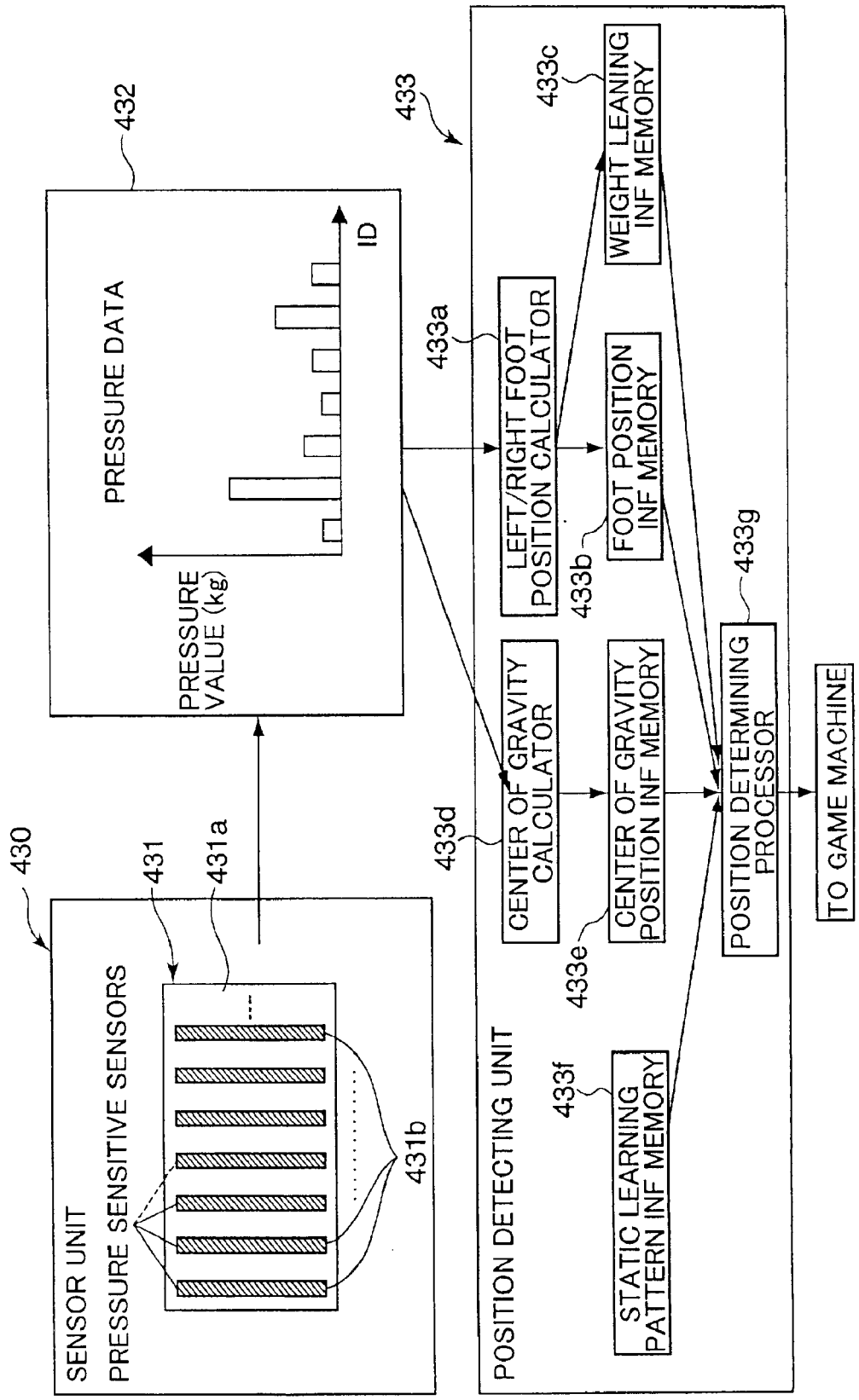

FIGHTING VIDEO GAME MACHINE

The present invention relates to a fighting video game machine for causing an enemy character appearing in a game image from a viewing point of a simulated camera which image is displayed on a monitor to launch an attack at the viewing point of the simulated camera while letting a game player standing in a play area prepared before the monitor fight back.

BACKGROUND OF THE INVENTION AND RELATED ART STATEMENT

A conventional game machine is constructed such that, in a game in which a game player shoots enemy characters displayed on a screen of a monitor fixed to a casing of a game machine from the front side of the screen using a simulated gun, a loudspeaker is built in the simulated gun, firing sounds are outputted from this loudspeaker, and hitting sounds given when bullets hit the enemy characters are outputted from a loudspeaker provided in the casing of the game machine in order to provide shooting sound effects with a better presence.

The conventional game machine provides only an acoustic presentation in response to shooting by the game player, but not an acoustic presentation in response to shooting from the game machine side. Particularly, there has been a difficult problem of how to judge the shooting result from the game machine side, i.e. how to judge whether the bullet shot by the game machine side has hit the game player. Further, provision of the loudspeaker in the simulated gun results in a larger construction of the gun and has not been satisfactory in view of operability.

In view of the above problems residing in the prior art, an object of the present invention is to provide a fighting video game machine capable of giving an acoustic presence for a shooting result from a game machine side.

BRIEF SUMMARY OF THE INVENTION

In order to achieve the above object, a fighting video game machine according to the present invention is for causing an enemy character appearing in a game image from a viewing point of a simulated camera which image is displayed on a monitor to launch an attack at the viewing point of the simulated camera while letting a game player standing in a play area prepared before the monitor fight back. The fighting video game machine comprises: a sound control unit for controlling a sound output corresponding to an attacking result from the enemy character, a first and a second sound generators provided in different positions for the sound output corresponding to the attacking result, and attacking result judging means for judging whether the attacking result from the enemy character displayed on the monitor is less or greater than a threshold value from the viewing point of the simulated camera, wherein the sound control unit causes a sound effect to be outputted from the first sound generator when the attacking result is greater than the threshold value while causing it to be outputted from the second sound generator when the attacking result is less than the threshold value.

These and other objects, features and advantages of the present invention will become more apparent upon a reading of the following detailed description and accompanying drawings.

BRIEF DESCRIPTION OF THE DRAWINGS

FIG. 15 is a chart showing further another embodiment of the head detector.

DETAILED DESCRIPTION OF THE PREFERRED EMBODIMENTS OF THE INVENTION

Figure 1:
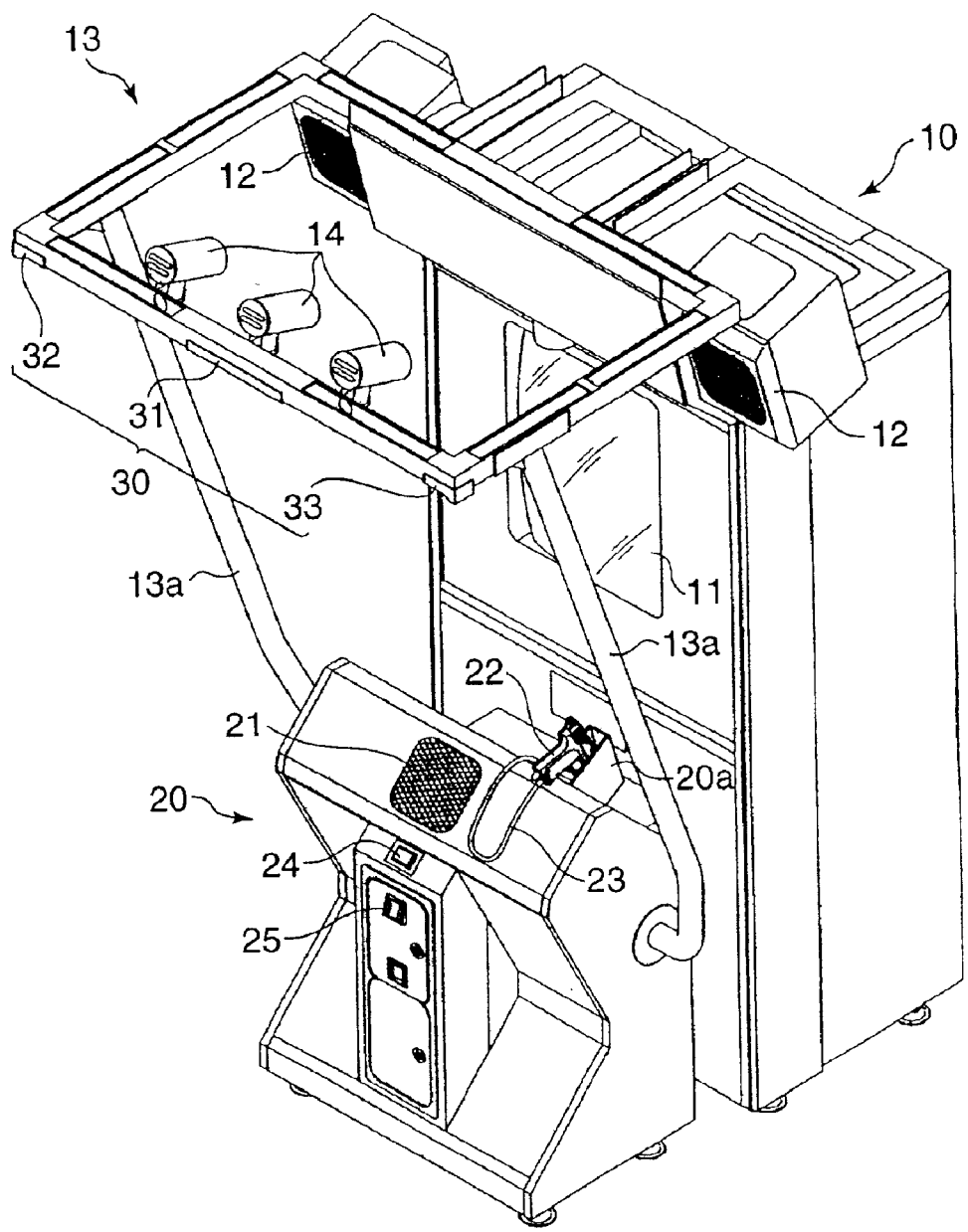
FIG. 1 is a perspective view showing one embodiment of a simulated 3D video game machine according to the present invention.

FIG. 1 is a perspective view showing one embodiment of a simulated 3D video game machine to which the present invention is applied. This game machine is provided with a game main unit 10, an operation casing 20 integrally or detachably or individually provided in front of the game main unit 10, and a head detector 30. A play area where a game player stands to play a game is defined before the operation casing 20.

The game main unit 10 is a console box substantially in the form of a rectangular parallelepiped, and a monitor 11 of a specified size for displaying game images is provided substantially in the middle of the front surface of the game main unit 10, preferably at such a height position where the game player's head is located substantially in the middle of the screen in a usual posture of the game player playing the game. Besides a CRT, an LCD, a plasma display, a liquid crystal projector and the like can be adopted as the monitor 11. Loudspeakers 12 for presenting sound effects are provided at the top, preferably at the left and right sides of the game main unit 10, and a panel or the like on which the name of the game, etc. is inscribed is provided therebetween. A circuit board on which controllers necessary to control the gaming operation, etc. is provided inside the game main unit 10. A rectangular frame member 13 extending forward like eaves is provided at the top of the game main unit 10, and supporting arms 13a are provided between suitable positions of left and right frame pieces of the frame member 13 and the side surfaces of the operation casing 20. A specified number of, e.g. three light sources 14 for electric decoration so as to correspond to three primary colors are provided on the front frame piece of the frame member 13 in such a manner as to face toward the game main unit 10.

Figure 2:
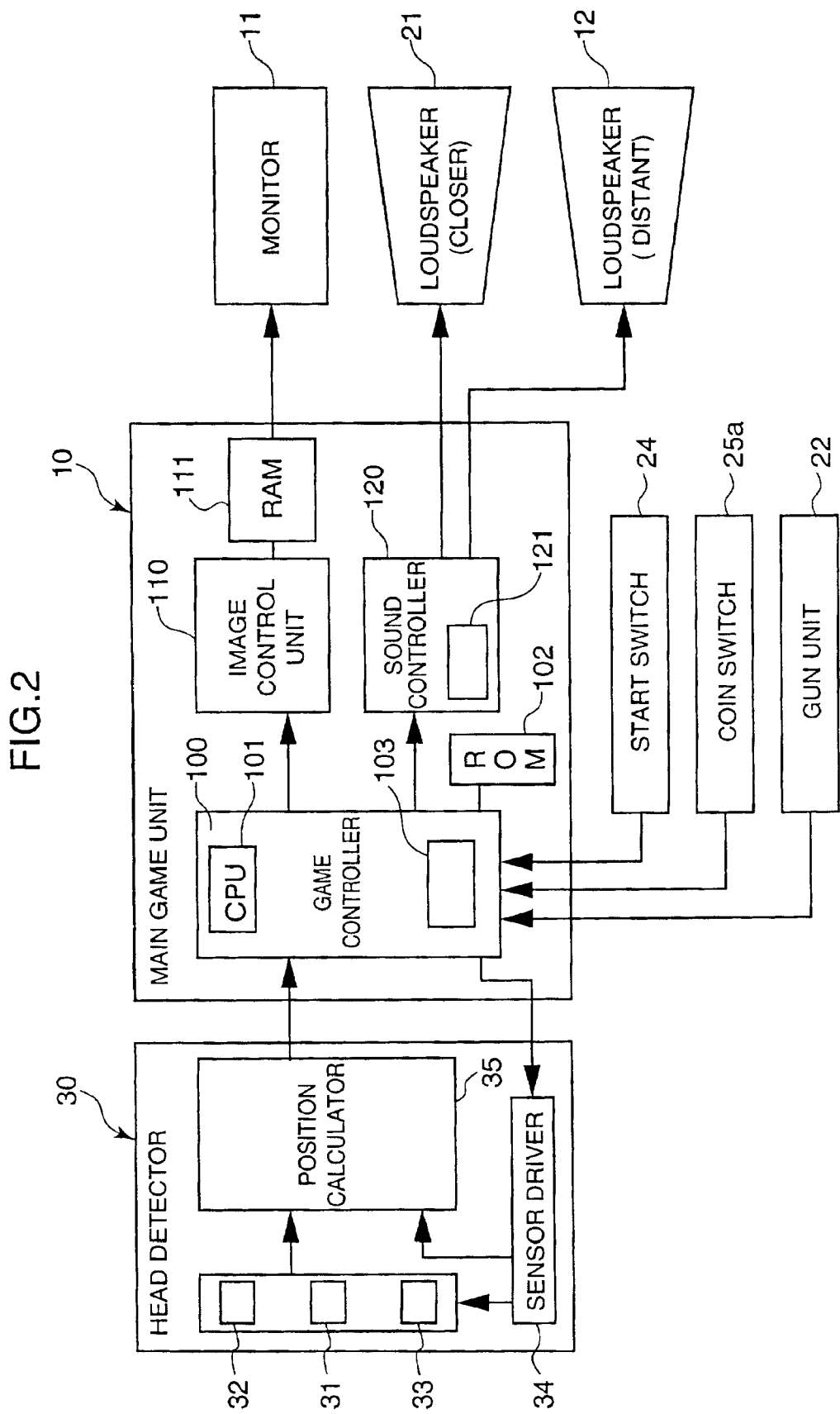
FIG. 2 is a block construction diagram of the 3D video game machine.

The frame member 13 functions as a supporting structure for the head detector 30, and is adapted to locate the head detector above the play area, i.e. above the game player's head. An ultrasonic transmitter 31 is provided in the transverse center of the front frame piece of the frame member 13, and ultrasonic receivers 32, 33 are transversely symmetrically provided with respect to the ultrasonic transmitter 31. Any of the ultrasonic transmitter 31 and the ultrasonic receivers 32, 33 is formed by a piezoelectric device or the like. The ultrasonic transmitter 31 transmits an ultrasonic pulse of a specified duration at such a width of directivity as to cover the play area and in a specified cycle of, e.g. ⅟₆₀ sec. or in such a time cycle capable of following a displacement of the game player's head at a necessary resolving power. The ultrasonic receivers 32, 33 are identically constructed and have a width of directivity sufficient to receive the ultrasonic waves transmitted from the ultrasonic transmitter 31 and reflected by the game player's head located in the play area. In the head detector 30 are provided, as shown in FIG. 2, a sensor driver 34 for supplying a drive signal (cyclical excitation pulse signal) to the ultrasonic transmitter 31, and a position calculator 35 connected with the sensor driver 34 and the two ultrasonic receivers 32, 33 and adapted to calculate the position of the game player's head in the space as described later. It should be noted that the sensor driver 34 and the position calculator 35 may be provided in the main game unit 10.

The height of the operation casing 20 is set lower than the monitor 11. A loudspeaker 21 for presenting sound effects is provided in the middle of the upper surface slightly sloped downward to the front, i.e. in a position closer to the game player than the loudspeakers 12, and a gun unit 22 simulating a gun as a game controller is provided in a specified position near the loudspeaker 21 via a cord 23 as a transmission line for control signals, etc. The gun unit 22 is stored in a containing box 20a as shown when not being used, while being held by the game player when being used, i.e. during the game to shoot the enemy characters displayed on the monitor screen as described later. A start switch 24, a coin slot 25, and the like are provided on the front surface of the operation casing 20. A coin switch 25a (see FIG. 2) for detecting the presence or absence of an inserted coin is provided in an intermediate position of a coin path connected with the coin slot 25.

FIG. 2 is a block construction diagram of the 3D video game machine. A game control unit 100, an image control unit 110 and a sound control unit 120 are mounted on the circuit board in the main game unit 10.

This game is, for example, a fighting game and assumes a battle of shooting between one or more gun-holding enemy characters displayed on the monitor screen and the game player. The enemy character displayed on the monitor screen is so controlled by the game control unit 100 as to shoot at a viewing point of a simulated camera, whereas the game player shoots the enemy character on the monitor 11 using the gun unit 22 while avoiding an attack from this enemy character.

The game control unit 100 is provided with, for example, a microcomputer (hereinafter, "CPU") 101 for controlling the progress of the game, and connected with a ROM 102 as a storage medium storing a game program such as a shooting battle game which is the game of this embodiment, the head detector 30 and other necessary elements. Besides the ROM, a ROM cassette, an optical disk, a flexible disk or the like may be used as the storage medium.

The image control unit 110 performs calculation of coordinates of the respective characters (enemy characters, various buildings and other object characters located in a game space) in a simulated 3D space when viewed from the viewing point of the simulated camera, a light source calculation, a calculation to transform the calculated coordinates in the simulated 3D space to those in a two-dimensional space, a processing to position polygons constituting an image to be formed in a display area of a RAM 111 and a texture mapping to the respective polygons. A position information transmitted from the head detector 30 as described later is used as an information on the viewing point of the simulated camera which is used in the calculation of the coordinates of the characters. Accordingly, the viewing point of the simulated camera substantially coincides with the eyes of the game player, and a character corresponding to the game player is not displayed on the screen of the monitor 11.

The sound control unit 120 reads a sound data set in the game program according to the scene of the game from a sound data storage 121 and causes the read data to be outputted as sounds from either one of the loudspeakers 12, 21. In addition to BGMs and various presentation sounds, shooting sounds, bullet-hitting sounds, sounds the stray bullets make while flying through the air, sounds the stray bullets make upon striking against obstacles displayed in front of the viewing point and other sounds are prepared as the sound data. The sound data are stored, for example, in PCM data format and are digital-to-analog converted, filtered and amplified after being read to be outputted from the loudspeakers as sounds.

In connection with the sound control unit 120, the CPU 101 is provided with a functional portion for performing a trajectory calculation. The trajectory of the bullet the enemy character displayed on the monitor screen shot at the game player by a shooting control of the CPU 101 is successively calculated based on an information on a firing position and a shooting direction by this functional portion. The image control unit 110 performs a processing of successively drawing the trajectory on the monitor screen based on the successively obtained calculation results (alternatively, only the presentation image at the time of shooting may be pictured without picturing the trajectory). Further, the sound controller 120 is provided with a functional portion for selectively switching the loudspeakers 12, 21 to output sounds according to, for example, a distance between the calculated trajectory of the bullet and the viewing point of the simulated camera as described later.

In this game, the CPU 101 is provided with a function of determining whether or not a bullet shot by the enemy character will hit the game player. This judgment is made by a shooting result judging means 103. The judging means 103 judges whether or not any obstacle exists between the enemy character and the viewing point of the simulated camera or whether or not a distance therebetween is fairly long. Alternatively, this judgment may be made by setting a hit rate at random, further suitably changing it according to the progress of the game, etc. or changing it according to a life gauge of the game player. The CPU 101 is also provided with a function of decreasing the life gauge by a specified amount when the game player is shot and a function of judging whether or not the life gauge has decreased to 0.

Here, the construction and operation of the gun unit 22 is described. In this embodiment, known construction and operation principle are adopted as those of the gun unit 22. Specifically, the gun unit 22 has an outer configuration similar to that of a gun, and an operation of pulling a trigger biased toward an initial position by a biasing means is detected by detecting a linked movement of a movable piece of a switch and such a detection is introduced in the form of a shooting command signal to the game control unit 100 via the cord 23. A light detecting sensor is so built in the gun unit 22 as to have a narrow directivity at the muzzle. When the shooting command signal is introduced to the game control unit 100, the CPU 101 functioning as a shooting position detector of the game control unit 100 interrupts an imaging processing to the monitor 11, sweeps a luminescent spot in horizontal(H) and vertical (V) directions for, e.g. only one frame, and measures a time which lapses until the light detecting sensor in the gun unit 22 detects this luminescent spot after the start of sweeping. Since a sweeping period for one frame is known from an adopted sweeping method, the gun unit 22 is assumed to have faced at the calculated coordinate position, i.e. to have been fired by inversely calculating the coordinate position of the luminescent spot on the screen of the monitor 11 based on the measured time. Alternatively, a following method may be adopted. An infrared CCD camera is mounted in the muzzle, whereas one or two infrared spot light sources are arranged at fixed positions near the monitor 11. A direction in which the camera was faced, i.e. a position toward which the gun unit 22 was faced is detected based on coordinates of the spot light source(s) within an image picked up by the CCD camera when the trigger was pulled.

The CPU 101 successively calculates the trajectory of the bullet shot by the game player in the game space on the screen of the monitor 11 and judges whether or not the shot bullet has hit the enemy character displayed on the screen by preferably causing the bullet to be displayed on the screen every time calculation is made. Whether or not the bullet has hit the enemy character is judged by the shooting result judging means 103 based on the results of the successively calculated trajectory and the coordinates of the position of the enemy character, i.e. based on whether the calculated coordinates of the bullet and the coordinates of the position of the enemy character coincide or substantially coincide.

Figure 3:
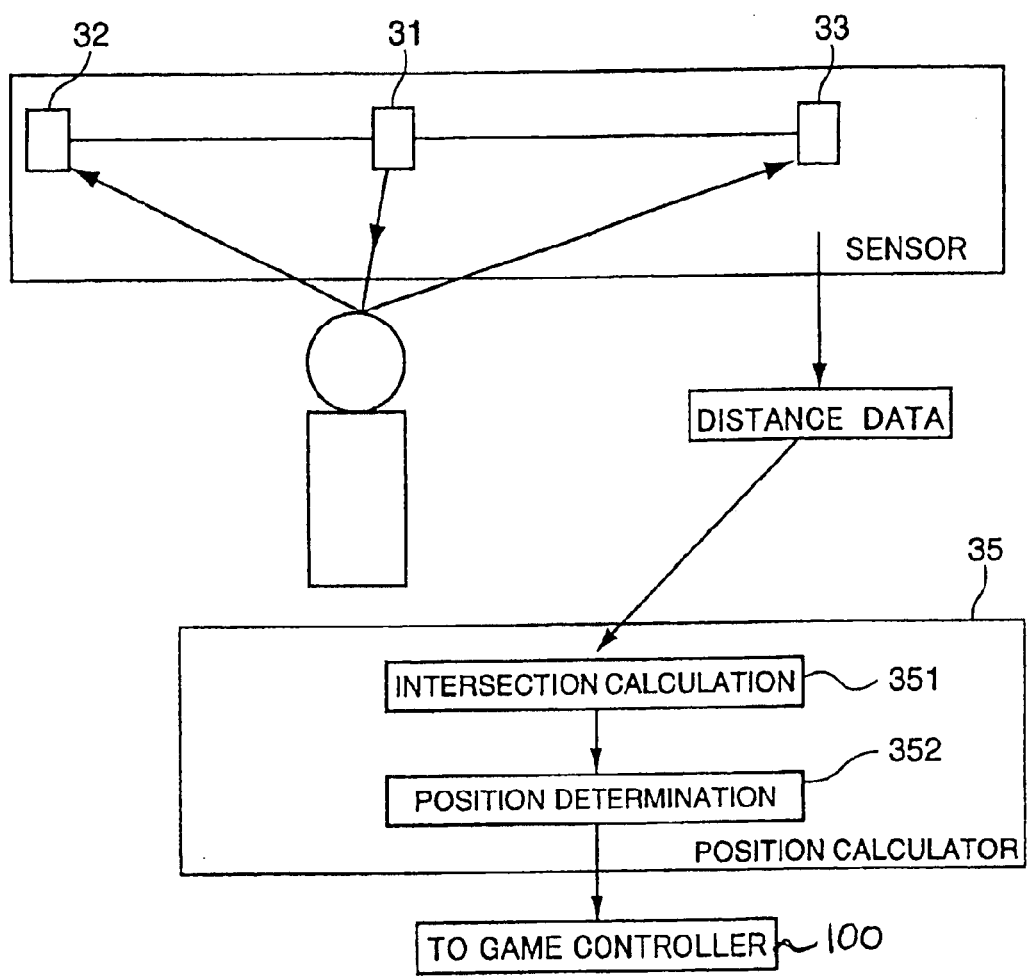
FIG. 3 is a diagram showing detection principle in a position calculator of a head detector.

Next, detection principle in the position calculator 35 of the head detector 30 is described with reference to FIG. 3. An ultrasonic pulse having a wide directivity transmitted from the ultrasonic transmitter 31 is reflected by the body of the game player located therebelow and a part of the reflected pulse is received by the ultrasonic receivers 32, 33. Since the game player's head is located at highest in his usual playing action, the pulse signals received by the ultrasonic receivers 32, 33 can be both assumed to be return waves reflected by the game player's head. The position calculator 35 measures periods which lapse until the rise of the pulse signals received by the ultrasonic receivers 32, 33 after the ultrasonic pulse was transmitted, and performs a geometric calculation using distance data obtained by converting the measured periods based on an air propagating sound velocity, distances between the ultrasonic transmitter 31 and the ultrasonic receiver 32 and between the ultrasonic transmitter 31 and the ultrasonic receiver 33, and a height information, thereby calculating the position of the game player's head in height direction and in transverse direction. Specifically, the measured periods at the side of the ultrasonic receiver 32 determine an ellipse having the ultrasonic transmitter 31 and the ultrasonic receiver 32 as foci.

Likewise, the measured periods at the side of the ultrasonic receiver 33 determine another ellipse having the ultrasonic transmitter 31 and the ultrasonic receiver 33 as foci. Since the position of the ultrasonic transmitter 31 is same, a bottommost intersection of the two ellipses can be calculated (intersection calculation 351), the position of the game player's head in height direction and in transverse direction in the space can be determined using the height information of the ultrasonic transmitter 31 and the ultrasonic receivers 32, 33 (position determination 352). In order to simplify the calculations, the intersection may be calculated assuming that the game player's head is located right below the ultrasonic transmitter and receivers 31, 32, 33, i.e. only by the calculation of the ellipses. Alternatively, a relationship between the two measured periods (i.e. the two distance data) and the position of the head may be calculated in advance and may be stored in a table format (LUT). The position calculator 35 sends the thus calculated position of the game player's head in height direction and in transverse direction in the space to the game control unit 100 as the viewing point information of the simulated camera. Accordingly, the viewing point of the simulated camera can be so changed or moved as to correspond to the position of the game player's head, i.e. follow a displacing amount and a displacing direction of the position of his head.

Figure 4A:
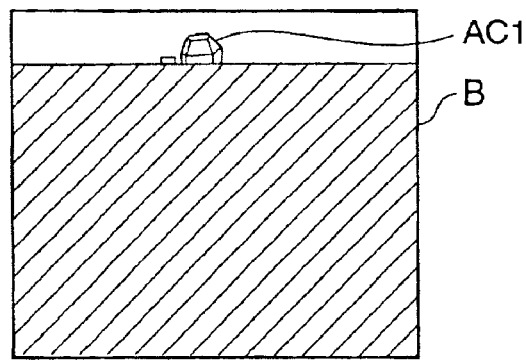
FIGS. 4A to 4D are diagrams showing one example of a change of a viewing point of images on a monitor screen when a game player's head is vertically moved.
Figure 4B:
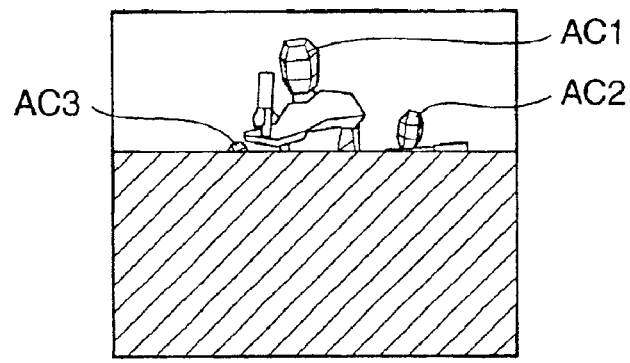
Figure 4C:
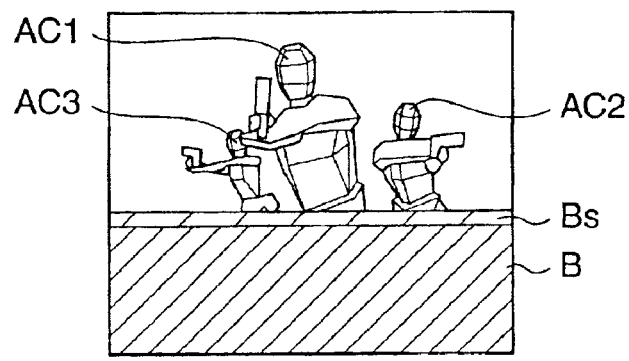
Figure 4D:
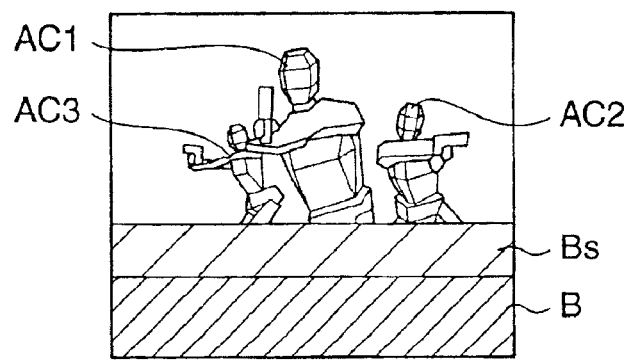
Figure 5:
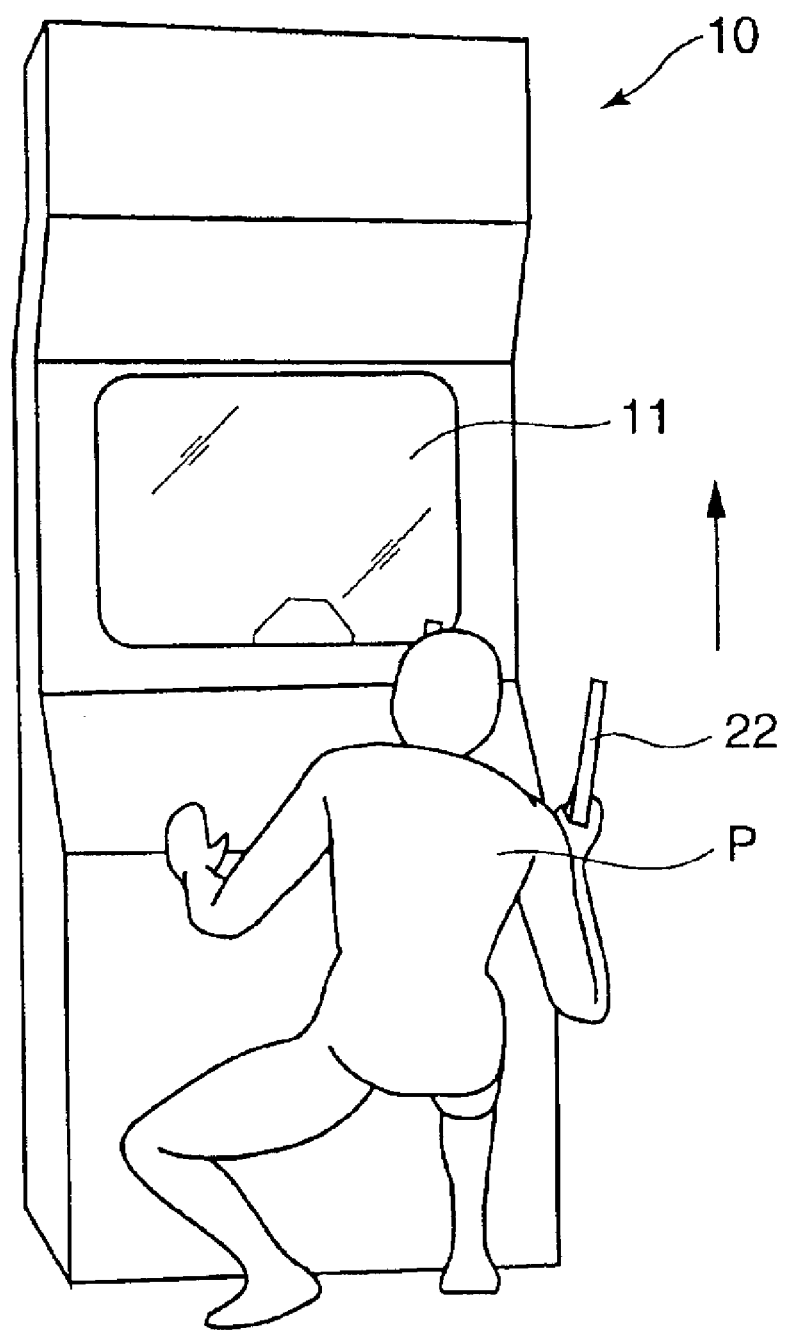
FIG. 5 is a diagram showing a game playing state of the game player.

FIGS. 4A to 4D are diagrams showing one example of a change of the viewing point of images on the monitor screen when the game player's head is vertically moved, and FIG. 5 is a diagram showing a game playing state of the game player. FIGS. 4A to 4D correspond to a lapse of time and show four scenes when the game player gradually rises from a half-sitting posture (see FIG. 5) to a substantially upright posture in a direction of an arrow in front of the main game unit 10, i.e. the game player's head (eyes) is displaced upward from below. FIG. 4A shows a state where there is an obstacle B like a desk right in front of the viewing point, the game player hides himself before the obstacle B at the front side, and part of the head of an enemy character AC1 holding a gun is seen behind the obstacle B. The scene shown in FIG. 4B is reached when the game player slightly lifts his head from the state of FIG. 4A, and shows that only the eyes of the game player are in alignment with the upper surface of the obstacle B, the enemy character AC1 is seen up to his chest, and two other enemy characters AC2, AC3 are newly seen behind the enemy character AC1. The scene of FIG. 4C is reached when the game player straightens his back to further lift his head, and shows that the eyes of the game player are slightly exposed from the upper surface Bs of the obstacle B, the upper halves of the bodies of the three enemy characters AC1, AC2, AC3 are seen and the upper surface Bs of the obstacle B is also slightly seen. The scene of FIG. 4D is reached when the game player stands upright, and shows that the game player is exposed from the obstacle B up to his neck and the upper surface Bs is more widely seen. As the eyes of the game player rise, the upper surface Bs of the obstacle B is gradually lowered as shown in FIGS. 4A to 4D.

Figure 6A:
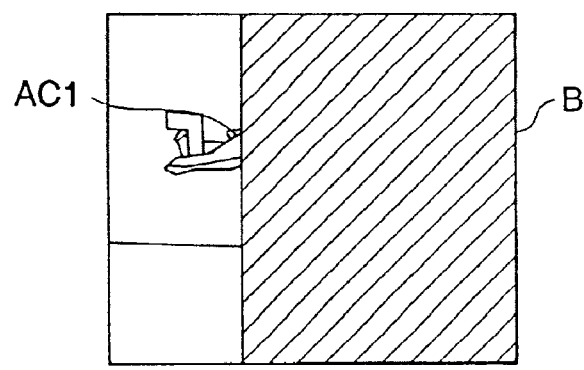
FIGS. 6A to 6D are diagrams showing one example of a change of the viewing point of images on the monitor screen when the game player's head is transversely moved.
Figure 6B:
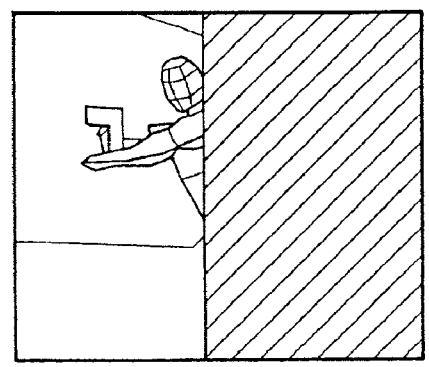
Figure 6C:
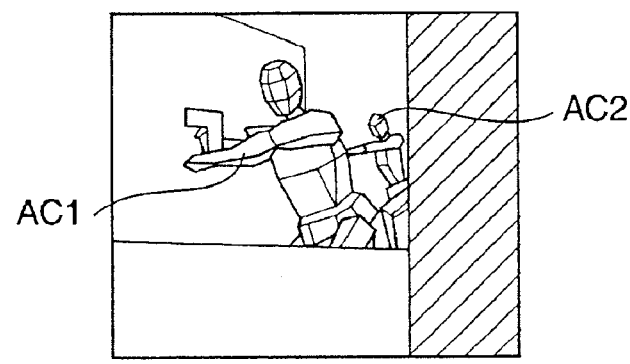
Figure 6D:
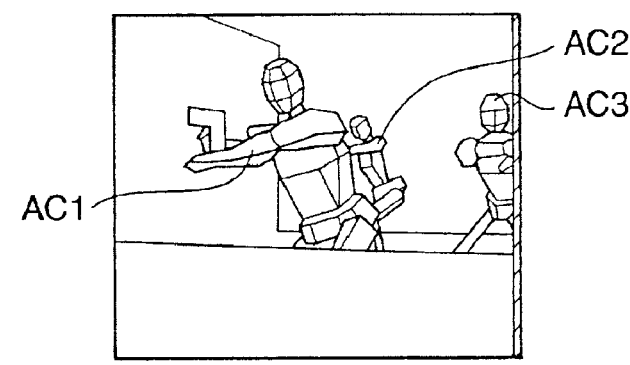
Figure 7:
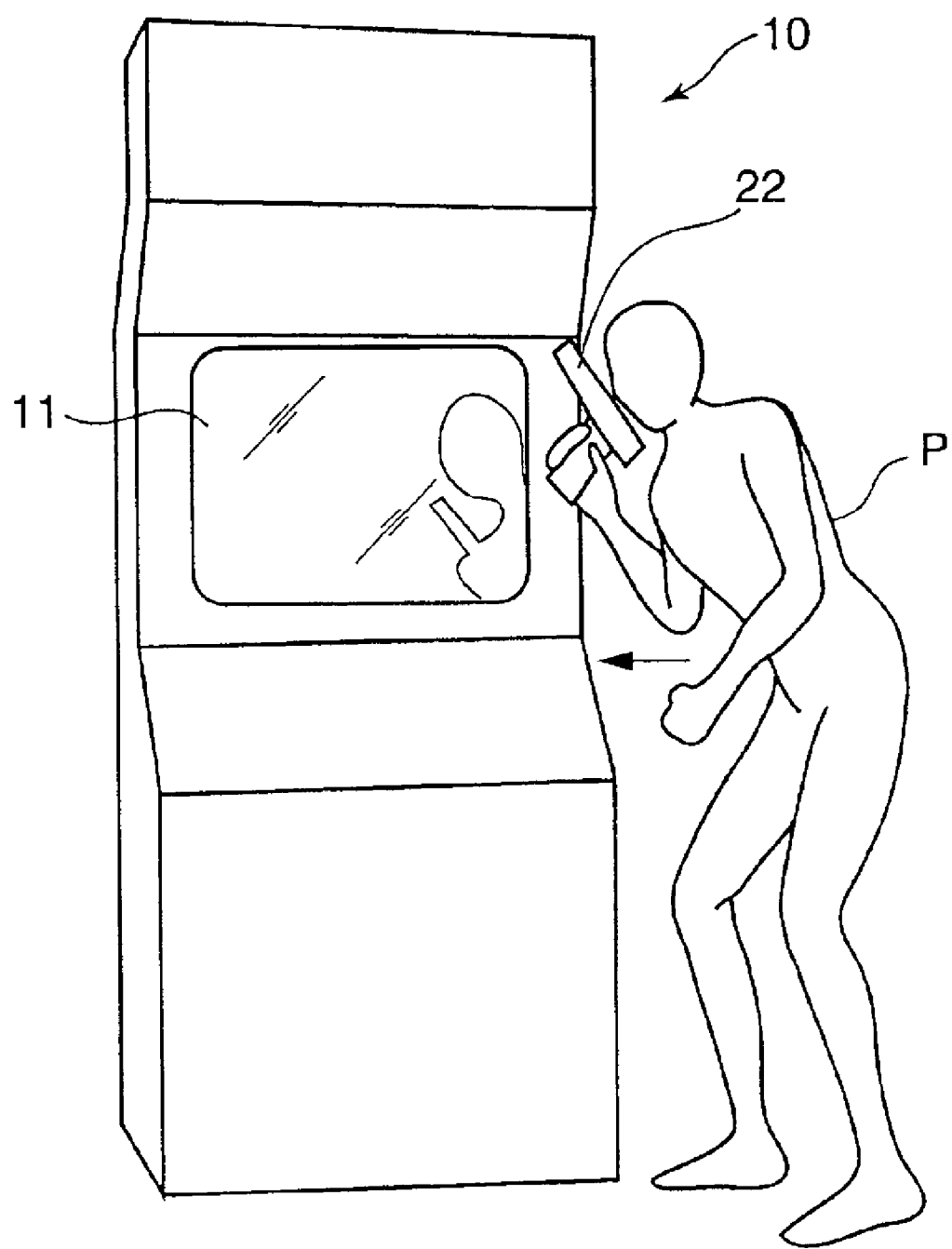
FIG. 7 is a diagram showing a game playing state of the game player.

FIGS. 6A to 6D are diagrams showing one example of a change of the viewing point of images on the monitor screen when the game player's head is transversely moved, FIG. 7 is a diagram showing a game playing state of the game player. FIGS. 6A to 6D correspond to a lapse of time and show four scenes when the game player gradually is moved to left in a direction of an arrow from the right side (see FIG. 7) of the main game unit 10, i.e. the game player's head (eyes) is displaced leftward from right. FIG. 6A shows a state where an obstacle B like a door or a wall exists right in front of and on the right side of the viewing point, the game player hides himself behind the obstacle B, and part of an arm of the enemy character AC1 holding a gun is seen on the other side of the obstacle B. The scene of FIG. 6B is reached when the game player slightly moves his head to left from the state of FIG. 6A, and shows that only the eyes of the game player are slightly exposed from the left end of the obstacle B and the face and the chest of the enemy character AC1 can be seen. The scene of FIG. 6C is reached when the game player further moves his head to left, and shows that the game player's head is slightly more exposed from the left end of the obstacle B, the upper half of the body of the enemy character AC1 is seen and part of another enemy character AC2 is newly seen behind the enemy character AC1. The scene of FIG. 6D is reached when the game player jumps to left from the obstacle B to expose the upper half of his body, and shows that still another enemy character AC3 is seen in addition to the two enemy characters AC1, AC2.

Since the head detector 30 can detect the vertical and transverse positions of the game player's head, when his head moves while having components of two directions, i.e. vertical direction and transverse direction, the viewing point can be moved accordingly, i.e. in an oblique direction.

Figure 8:
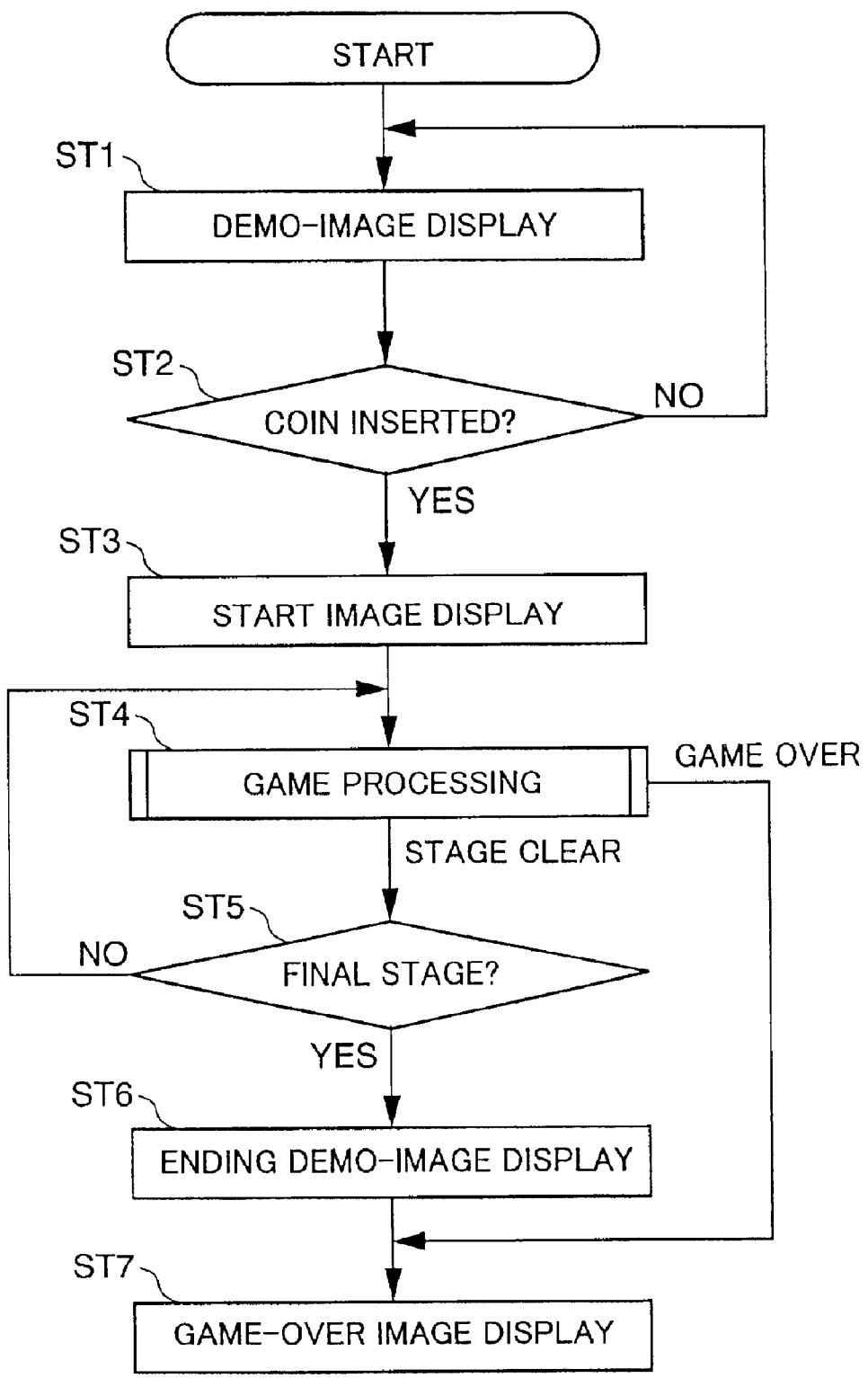
FIG. 8 is a flow chart showing an example of a game progress processing executed by a CPU.

FIG. 8 is a flow chart showing an example of a game progress processing executed by the CPU 101. When the game machine is turned on, the main routine starts, whereby a demonstration screen is first displayed on the monitor 11 (Step ST1). When insertion of a specified coin is detected by the coin switch 25a (YES in Step ST2), a start screen is displayed (Step ST3) and the gaming processing as a shooting game is executed (Step ST4). In a mode wherein the game is comprised of a specified number of stages, a judgment is made as to whether a specified condition is not met during each stage. For example, an judgment is made by the control of the CPU 101 functioning as a life game administering means as to whether the life gauge displayed in, for example, an upper area of the screen of the monitor 11 has decreased to a specified value or below, e.g. to 0. If a condition such as shooting all enemy characters appearing during the stage is cleared before the life gauge reaches 0, it is discriminated whether the next stage is a final stage (Step ST5). Conversely, if the life gauge reaches 0 during the game, the display content on the monitor 11 is switched to a game-over screen, thereby forcibly ending the game.

On the other hand, if the cleared stage is a final stage, an ending demonstration screen presenting a commendation is displayed (Step ST6) and the game-over screen is displayed (Step ST7) after displaying scores or the like if necessary, thereby ending the game.

Figure 9:
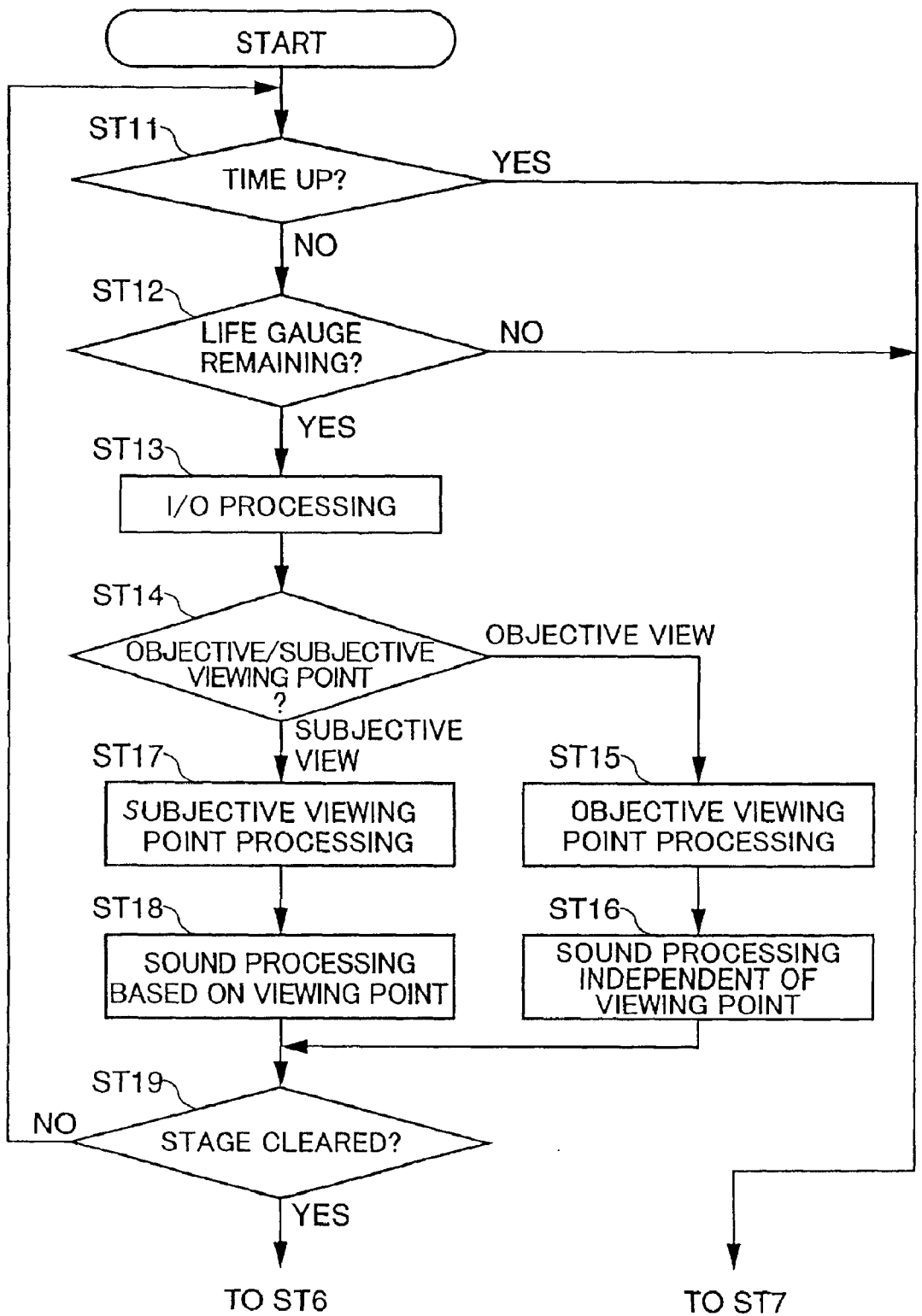
FIG. 9 is a flow chart showing a subroutine "Gaming Processing" executed in Step ST4.

FIG. 9 is a flow chart showing a subroutine "Gaming Processing" executed in Step ST4. During the gaming processing, a judgment is made as to whether or not a gaming time set for each stage and measured by a built-in timer has elapsed (Step ST11) and then it is discriminated whether there still remains any life gauge (Step ST12) if the gaming time has not elapsed yet. If the discrimination results in both Steps ST11, ST12 are negative, Step ST7 follows. On the other hand, if there still remains some life gauge, an I/O processing is executed, i.e. an information on the position of the game player's head, i.e. an information substantially on the positions of the game player's eyes is transferred from the head detector 30 (Step ST13).

It is then discriminated whether the current viewing point is an objective viewing point or a subjective viewing point (Step ST14). In this game, during a certain period at the beginning of each stage, the CPU 101 functioning as an objective/subjective viewing point switching means and the timer causes an overall situation of the game space, i.e. an image of a wide area to be displayed by retracting the simulated camera to include the player character so that the game player can grasp and recognize where he is in game space. During this period, the viewing point is set at the subjective viewing point. On the other hand, upon completion of the imaging processing by the subjective viewing point, the viewing point is switched to the objective one based on the game player's eyes. In step ST14, if the viewing point is the objective one, the game image is formed at the viewing point independent of the information obtained by the I/O processing (Step ST15), and if a shooting battle occurs, an interrupt processing for the sound control starts to output respective sounds relating to shooting from the loudspeakers 12 (or both the loudspeakers 12 and 21) (Step ST16).

On the other hand, if the viewing point is switched to the subjective one, the game image is formed at the subjective viewing point based on information obtained by the I/O processing (Step 17), and if a shooting battle occurs, the respective sounds relating to shooting are separately outputted from the loudspeakers 12 or the loudspeaker 21 by the interrupt processing (Step 18). Upon completion of sound processing in Steps ST16, ST18, it is discriminated whether the current stage has been completed. Unless the current stage has been completed, this subroutine returns to Step ST11 and the operations of Steps ST11 to ST18 are repeated. If it has been completed, this subroutine returns to Step ST6 to exit therefrom.

Figure 10:
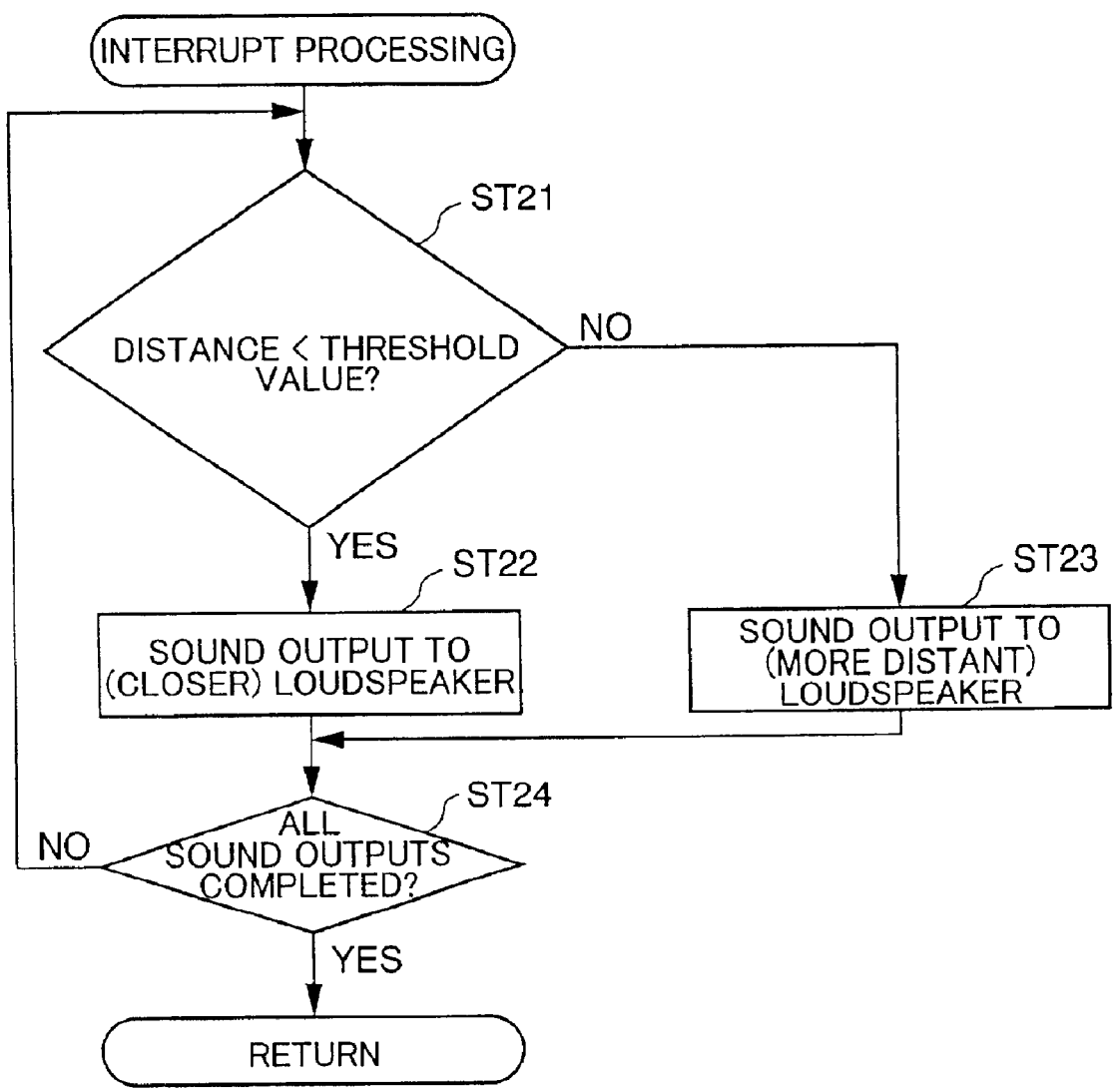
FIG. 10 is a flow chart showing a sound processing in response to shooting from enemy characters in a subroutine "Sound Processing based on a Viewing Point" executed in Step ST18.

FIG. 10 is a flow chart showing an "Interrupt Processing" in response to shooting from the enemy character in a subroutine "Sound Processing based on a Viewing Point" executed in Step ST18. In FIG. 10, the interrupt processing for the sound output is started upon firing by the enemy character, and it is discriminated whether a distance in the game space between the object which is supposed to make sounds (sound-making object) and the viewing point is smaller than a threshold value used in judging a long or short distance (Step ST21). The sound-making object may be a bullet fired by the enemy character or an obstacle which is located before the viewing point and on which the fired bullet hits. Specifically, when the bullet from the enemy character hits the obstacle before the viewing point, hitting sounds are outputted from the loudspeaker 21 (Step ST22) if the distance to this obstacle is smaller than the threshold value (if it is close) while being outputted from the loudspeakers 12 (Step ST23) if the distance is larger than the threshold value (if it is distant).

The sound control unit 120 is provided with a function of judging that the fired bullet passed such a point very close to the viewing point that the bullet is assumed to have hit the game player based on the result of distance between the position of the bullet successively obtained by the trajectory calculation and the viewing point. Upon making such a judgment, the sound controller 120 executes such a presentation as to, for example, temporarily shake the screen, decreases the life gauge by a specified value as a hit processing to the game player (hit-presentation processing) and causes the hitting sounds to be outputted from the loudspeaker 21 (Step ST22). If the fired bullet hits neither the obstacle in front of the viewing point nor the game player, a sound of the bullet hurtling through the air is outputted from the loudspeaker 21 at a timing when the calculated distance between the position of the bullet whose trajectory is successively calculated and the viewing point becomes smaller than the threshold value (Step ST22).

Although other sound effects relating to shooting are outputted from the loudspeakers 12, sound effects, for example, by return shooting from the game player may be outputted from the loudspeaker 21. This eliminates the need for providing a loudspeaker in the gun unit 22, making the gun unit 22 smaller and lighter. As described above, the output of the sounds is switched such that the sounds are outputted from the loudspeakers 12 more distant from the game player if the sound-making object is distance from the viewing point, whereas they are outputted from the loudspeaker 21 if it is close to the game player. Thus, a game having an acoustically better presence can be provided.

Upon completion of the sound output processing for a certain sound, it is then discriminated whether the sound output processing for all sounds has been completed, i.e. whether any presentation (hitting on the obstacle before the viewing point, hitting on the game player or missing the game player by passing right beside him) in response to one fired bullet has occurred (Step ST24). Step ST21 follows if no presentation has occurred, whereas this subroutine returns on the assumption that the sound output processing for this bullet has been completed if some presentation has occurred. It should be noted that the number of the loudspeaker 21 is not limited to one, and two loudspeakers 21 may be arranged side by side. In such a case, sounds may be outputted while switching the left and right loudspeakers according to whether the game player's head is located at the left or right side within the play area or a further better acoustic presence may be provided by, for example, the switching of the acoustic effect in transverse direction in addition to the switching thereof according to the distance by adjusting a volume ratio to conform to the situation.

Figure 11:
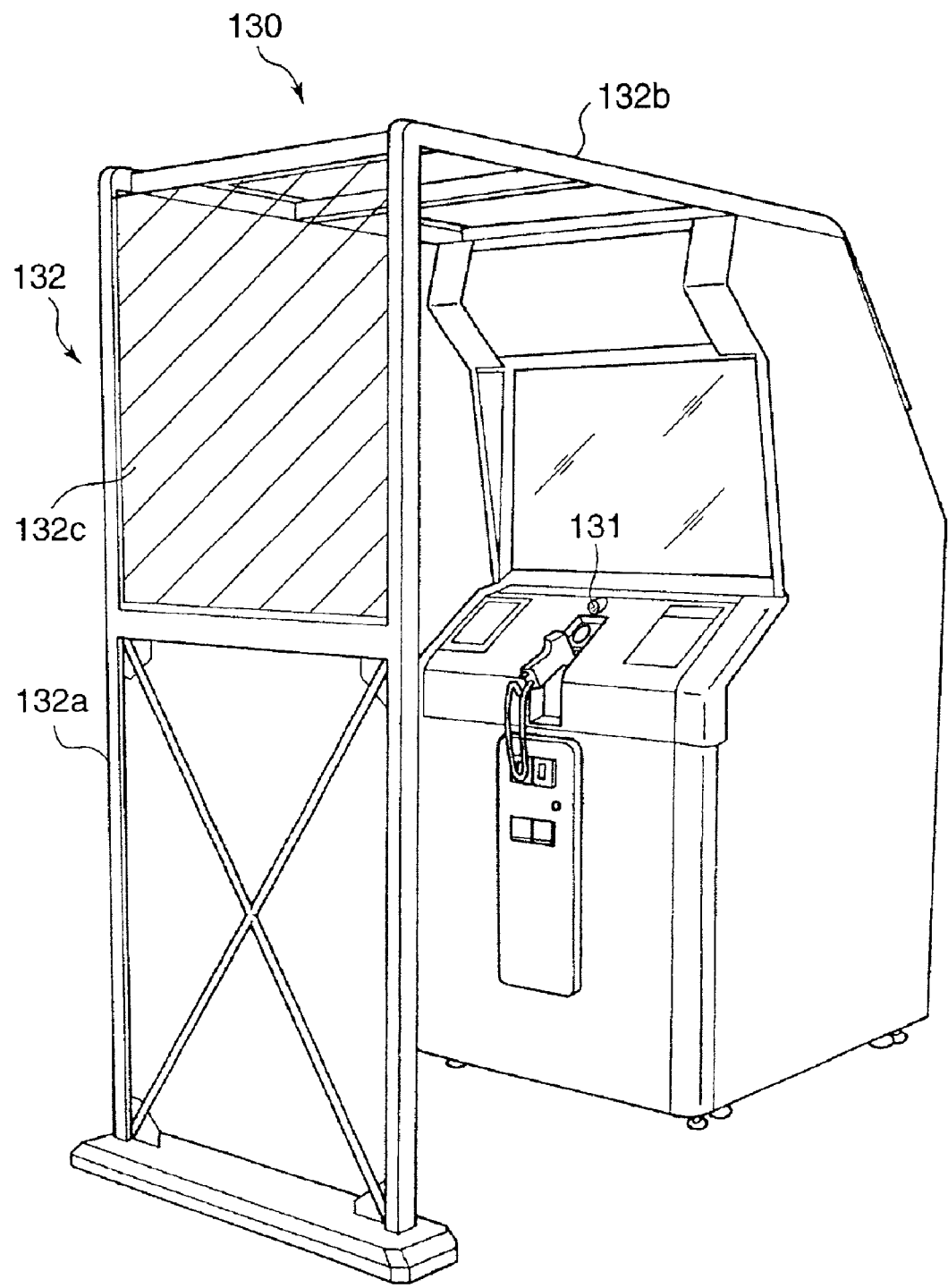
FIG. 11 is a perspective view showing a second embodiment of the 3D video game machine according to the present invention.
Figure 12:
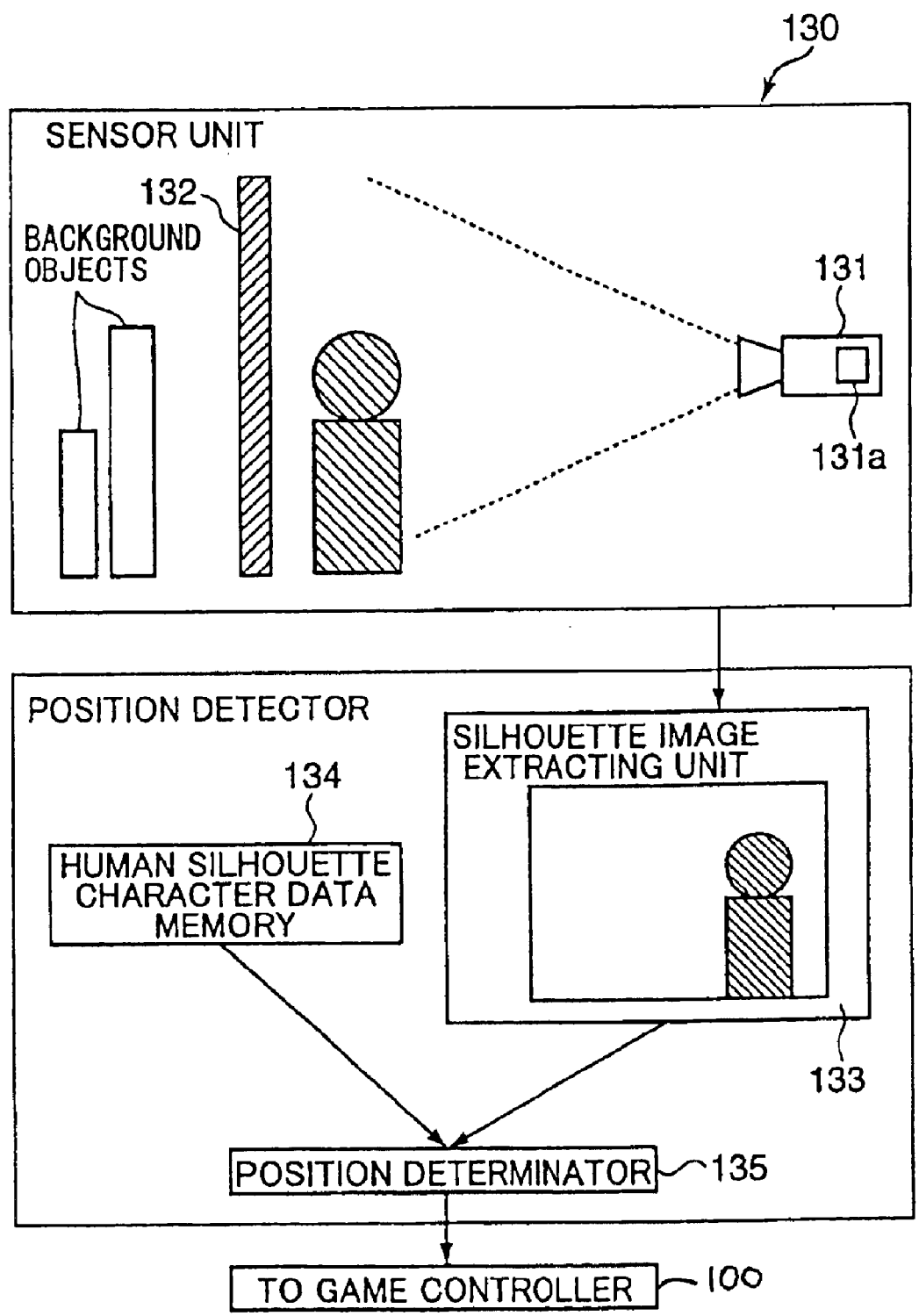
FIG. 12 is a block diagram showing detection of a game player's head in the game machine shown in FIG. 11.

FIG. 11 is a perspective view showing a second embodiment of the 3D video game machine to which the present invention is applied, and FIG. 12 is a block construction diagram for the detection of the game player's head. Although this game machine is slightly different from the one shown in FIG. 1 in appearance, the two game machines are substantially identical in function except the construction of the head detector 30.

In the second embodiment, a head detector 130 is comprised of, for example, a CCD camera 131 as an image pickup means arranged right below the monitor 11 and in a transversely center position, a background deleting member 132 provided at a side of the play area opposite from the CCD camera 131, a silhouette image extracting means 133 as a functional portion, a human silhouette characteristic data memory 134 for storing a human silhouette characteristic data and a position determining device 135. The means 133, the memory 134 and the device 135 are provided as a position detector. The CCD camera 131 is oriented such that its side toward the play area serves as an image sensing area.

The background deleting member 132 includes a rectangular support 132a standing at the front side as if it would surround the play area, an upper horizontal coupling arm 132b to be coupled with the main game unit 10 to hold the support 132a upright, and a screen 132c having a stripe pattern of a specified single color such as blue, a two-color stripe pattern or the like adhered to the upper half of the support 132a on its outer surface. The screen 132c is of such a size and a form, preferably a rectangular form as to cover a range where the game player's head can be possibly displaced in a usual gaming posture and is provided at such a height position as to cover his head regardless of whether the game player is in his bending posture or in his upright posture. The screen 132c may be semitransparent, so that people standing behind the screen 132c can see the game player's movements and images displayed on the monitor 11.

The CCD camera 131 has such an angle of view that the screen 132c becomes a visual field, so that background objects (e.g. various objects at an amusement arcade (other game machines, etc.) and people) behind the screen 132c are not included in a picked image. Preferably, the CCD camera 131 is a color image pickup means in which filters of respective colors of red, green and blue are arranged on the front surfaces of CCDs. The CCD camera 131 picks up an image on the screen 132c in a specified cycle of, e.g. 1/60 sec. or in such a time cycle capable of following a displacement of the game player's head at a specified resolving power, and stores the picked images in an image memory 131a provided therein while being administering them by addresses. The silhouette image extracting device 133 extracts a human silhouette by executing such a processing to delete a blue image from an image data stored in the image memory 131a and including images of the game player and the screen 132c behind the game player. This extraction processing can be performed by simply handling a blue area as a data nonexistent area. Further, in a mode where the screen 132c has a stripe pattern, a processing to delete such a basic pattern area may be performed.

The position determining device 135 extracts the head from the human silhouette based on the human silhouette obtained by the silhouette image extracting device 133 and the human silhouette characteristic data stored in the human silhouette characteristic data memory 134 using a pattern recognition technique or like technique, calculates the positions of the eyes at the head, e.g. a center position of the head area and determines the position assuming that the calculated position is the position of the game player's eyes. The obtained position information is sent to the game control unit 100 and then used as a viewing point information as in the first embodiment.

Besides the head detectors 30, 130 of the first and second embodiments, the head detector of the present invention may be embodied as follows.

(1) The CCD camera of the head detector 130 in the second embodiment may be converted into an infrared camera by providing an infrared filter on the front surface of a CCD sensing surface, an infrared light source for irradiating infrared rays in such a range as to cover the screen 132c may be provided in proximity to the infrared camera, and a material for absorbing the infrared rays may be applied, for example, to the front surface of the screen 132c. With this construction, an image pickup area of the screen 132c has a low luminance since no reflected light is returned from the screen 132c and, accordingly, the infrared camera can emphasize a difference in brightness between the image pickup area and a reflecting area of the game player. Thus, the human silhouette can be easily extracted. On the other hand, a material for reflecting the infrared rays may be applied, for example, to the front surface of the screen 132c. With this construction, the image pickup area of the screen 132c has a high luminance since the infrared rays are strongly reflected by the screen 132c and accordingly the infrared camera can emphasize a difference in brightness between the image pickup area and a reflecting area of the game player. Thus, the human silhouette can be easily extracted.

Further, a screen on which areas made by the infrared ray reflecting material and those made by the infrared ray absorbing material may be alternately arranged as in a stripe pattern may be used. With such a screen as well, the human silhouette can be easily extracted as in the case of the strip pattern of the second embodiment.

Figure 13:
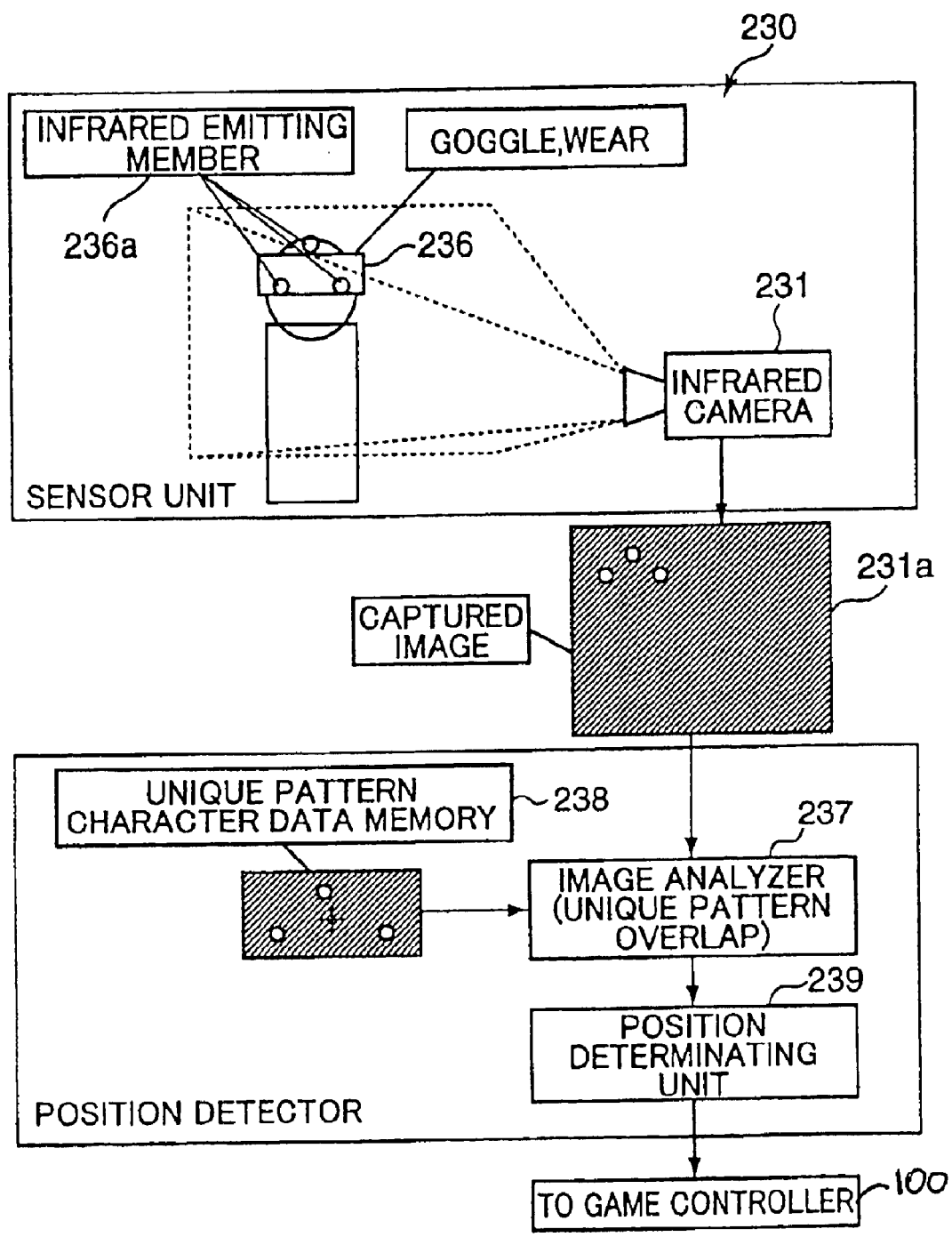
FIG. 13 is a block diagram showing another embodiment of a head detector.

(2) FIG. 13 is a block diagram showing another embodiment of the head detector. A head detector 230 has an infrared camera 231 as described in (1) and a structural element mountable on the game player's face or head. A goggle or a head fitting element 236 having a specified number of, e.g. three spot infrared ray emitting elements 236a for emitting an infrared ray is provided on the front side of the structural element. An image memory 231a, an image analyzer 237, a unique pattern characteristic data memory 238 and a position determining device 239 are provided in a processing unit of the head detector 230. When an image of the game player is picked up by the infrared camera 231, image data of three luminous points are stored in the image memory 231a, and an image pattern made up of these three points is compared with a data in the unique pattern characteristic data memory 238 by the image analyzer 238 to specify storage positions in the image memory 231a, i.e. addresses. The position determining device 239 calculates the position of the game player's eyes based on three pieces of address information in accordance with a preset equation and sends the calculated position to the game control unit 100. Although the number of the infrared ray emitting members 236a is set at 3, the position of the game player's eyes is substantially detectable if at least one infrared ray emitting member 236a is provided. Particularly, if two or more infrared ray emitting members 236a are provided, there is an advantage of more precisely determining the position of the game player's eyes since the inclination of the head or face can be simultaneously detected.

A specified number of reflectors for reflecting the infrared rays may be provided on the head fitting element 236 instead of the infrared ray emitting members 236a, and an infrared ray emitting means having a wide irradiation range at a side of the main game unit 10 may be provided, so that the infrared camera 231 can sense the rays reflected by the reflectors. This arrangement brings about the same effects as above and has an additional effect of making the head fitting element 236 lighter since it needs not be provided with a power source, a driving means, etc. for emitting the infrared rays.

Figure 14A:
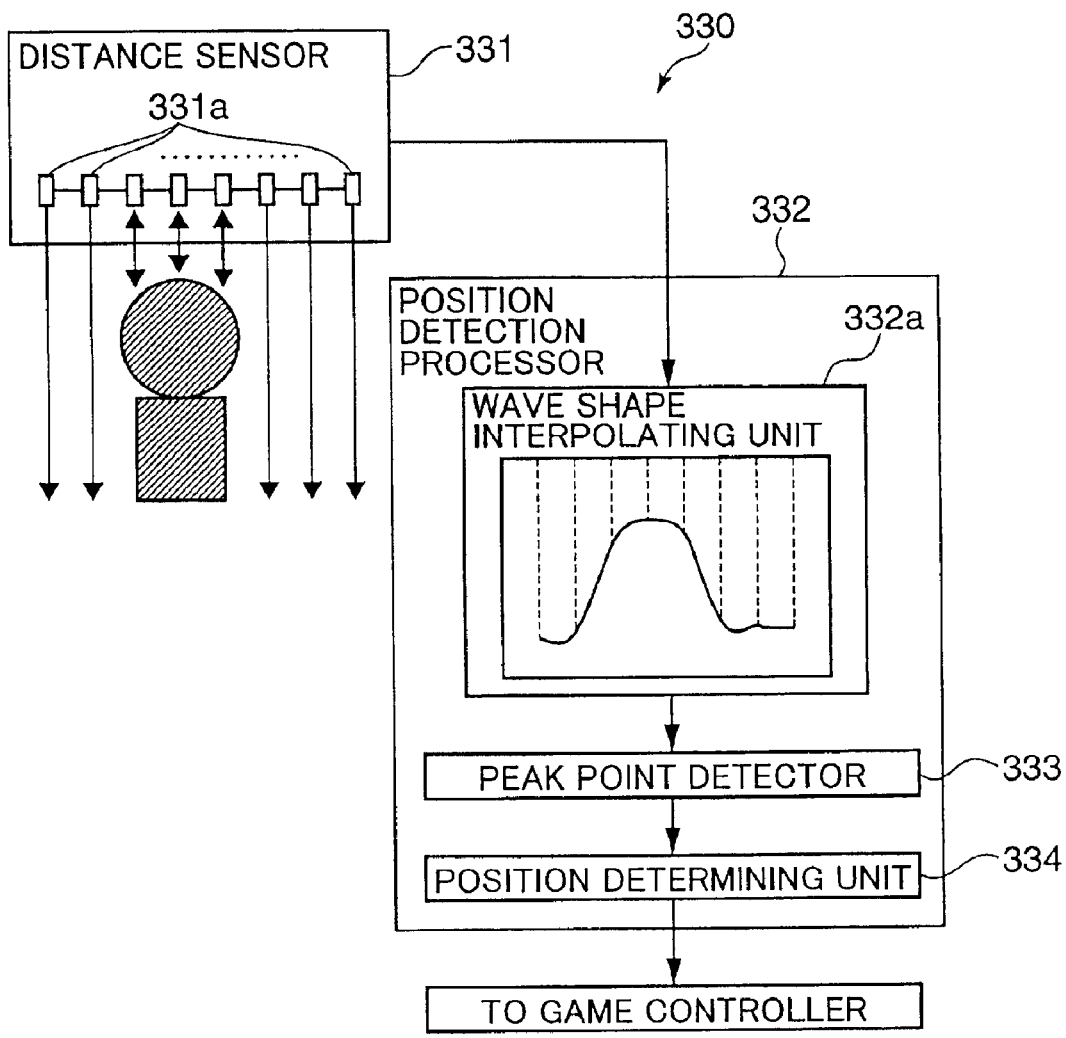
FIG. 14A is a block diagram showing still another embodiment of the head detector and FIG. 14B is a graph for the explanation of position determination.
Figure 14B:
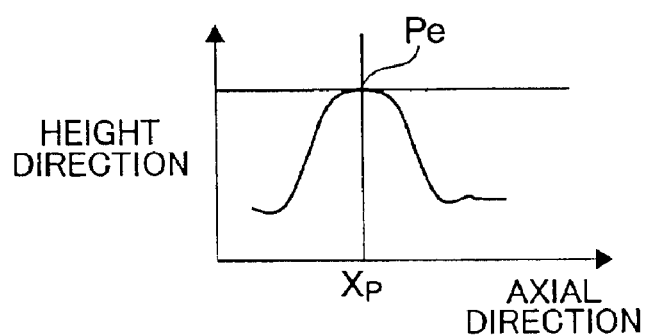

(3) FIGS. 14A and 14B show still another embodiment of the head detector, wherein FIG. 14A is a block diagram and FIG. 14B is a diagram for the explanation of the position determination.

A head detector 330 is provided with a distance measuring sensor 331 including a plurality of ultrasonic transmitting and receiving devices 331a transversely arranged at specified intervals above the play area, and a position detector 332, a peak point detector 333 and a position determining device 334 are provided in a processing unit thereof. Each ultrasonic transmitting and receiving device 331 includes at least a piezoelectric device, an exciting device for exciting the piezoelectric device by a pulse signal to cause it to send an ultrasonic pulse, a receiving device for receiving a reflected wave, and a circuit for switching signal input/output directions. The distance measuring sensor 331 may be a reflection type optical sensor (preferably infrared sensor) provided with a light emitting element and a light detecting element. The respective ultrasonic transmitting and receiving devices 331a of the distance measuring sensor 331 are so constructed as to have a width of directivity toward right below, so that the head of the game player in the play area can be detected by any (preferably two or more) of the ultrasonic transmitting and receiving device(s) 331a. Alternatively, the ultrasonic transmitting and receiving devices 331a are mounted at intervals narrower than the width of a head having a standard size.

Although the ultrasonic transmitting and receiving devices 331a may simultaneously transmit ultrasonic waves, they may successively do so at a high speed or at least every other ultrasonic transmitting and receiving device 331a may alternately do so for detection in order to prevent mutual interference of neighboring ultrasonic transmitting and receiving devices 331a. Since an ultrasonic beam having a narrow directivity provides a shortest distance data when it is received by the ultrasonic transmitting and receiving device 331a which sent it, there is no particular problem in specifying the ultrasonic transmitting and receiving device 331a having the shortest distance data even if the waves are interfered upon being received by the neighboring ultrasonic transmitting and receiving devices 331a.

As shown in FIGS. 14A and 14B, the return waves reflected by the game player's head are received by the same ultrasonic transmitting and receiving devices 331a, and the position detector 332 calculates distances based on periods which elapse from points of time of transmission to points of time of reception using a sound velocity information. In this way, a relationship (as shown in a graph 332a) in data between the interval of the ultrasonic transmitting and receiving devices 331a and the distance can be obtained. The peak point detector 333 detects a height position Pe and a transverse position Xp of a peak point as shown in FIG. 14B from the data on the interval and the distance. Since a graph is convex in height direction as shown in FIG. 14B, the peak point detector 333 can detect the peak point even if the peak point is located between the two ultrasonic transmitting and receiving devices 331a by providing the position detector 332 with a function of generating a continuous data using a model function prepared in advance. The position determining device 334 can determine the height position of the game player's eyes by subtracting a specified value from the detected height position Pe of the top of the game player's head and the transverse direction based on the arrangement interval of the ultrasonic transmitting and receiving devices 331a. An information on the height position and the transverse position of the game player's eyes thus obtained is sent to the game control unit 100.

(4) FIG. 15 is a diagram showing further another embodiment of the head detector. A head detector 430 is provided with a pressure-sensitive sheet member 431 laid on the play area and is adapted to detect the positions of both feet of the game player and determine the position of the head using this information and other pieces of information to be described later.

The pressure-sensitive sheet member 431 is constructed such that sensors elongated in forward and backward directions are transversely arranged side by side at intervals at least narrower, preferably sufficiently narrower than the width of the game player's feet (in FIG. 15, large intervals are drawn in an exaggerated manner in order to facilitate description and drawing). A known sheet member can be adopted as the pressure-sensitive sheet member 431. For instance, the sheet member 431 is fabricated by printing elongated pressure-sensitive conductive ink portions 431b formed of, for example, a thermoplastic resin in which a pressure-sensitive conductive ink obtained by diffusely mixing conductive particles and nonconductive particles at corresponding positions of facing surfaces of two flexible film bases 431a and then adhering the two film bases 431a together. Lead wires (thermoplastic resin in which conductive particles such as silver particles are diffusely mixed) provided with insulation coatings are drawn from the respective pressure-sensitive ink portions 431b to the outside the film. A specified voltage is applied to the lead wires of one film base 431a, and a circuit for detecting the voltage is so connected with the lead wires of the other film base 431 that it can recognize the respective lead wires. Fine irregularities (resulting from the presence of fine particles during printing) are formed on contact surfaces of the pressure-sensitive ink portions 431*b* of the both film bases 431*a* put together. The voltage appearing in the lead wires of the other film 431*a* can be detected in an analog manner by a substantial change in the contact areas of the ink surfaces by application of a pressure on the film bases 431*a*, i.e. a change in resistance on the contact surfaces.

In a pressure data memory 432, voltage values detected by the voltage detecting circuits for the individual pressure-sensitive ink portions 431*b*, i.e. pressure data are stored in correspondence. In FIG. 15, stored contents are represented as a distribution curve. A left/right foot position detector 433*a* calculates an information on the positions of the respective feet of the game player in transverse direction on the pressure-sensitive sheet member 431 by obtaining a center of an area where loads from the left and right feet can be judged based on the stored contents of the pressure data memory 432. The calculated position information is stored in a foot position information memory 433*b*. The left/right foot position detector 433*a* also adds the pressure data within the foot area for each foot and stores added values in a weight leaning information memory as a weight leaning information.

A center of gravity calculator 433*d* calculates a center of gravity position of the loads on the pressure-sensitive sheet member 431 with respect to transverse direction, i.e. a waist position of the game player based on the contents stored in the pressure data memory 432, and a calculation result is stored in a center of gravity position information memory 433*e*. In a statistical learning pattern memory 433*f* are stored pattern data used to assume the position of the game player's head based on the positions of both feet, exertion of the weight, the position of the waist, etc. from a human-factors engineering or empirical standpoint. A position determining device 433*g* determines the position of the game player's head based on the contents stored in the foot position information memory 433*b*, the weight leaning information memory 433*c*, the center of gravity position information memory 433*e* and the statistical learning pattern memory 433*f*. The determined head position information is sent to the game control unit 100.

By laying the pressure-sensitive sheet member 431 on the play area in this way, the transverse position of the head above the pressure-sensitive sheet member 431 can be determined based on the position information on the game player's feet. Therefore, it is not necessary to specially prepare an arrangement space and a construction for the head detector.

(5) FIG. 16 is a diagram showing another embodiment of the pressure-sensitive sheet member of the head detector. In this embodiment, the head detector includes a pressure-sensitive sheet member 531 laid on the play area and is adapted to detect the positions of both feet of the game player and determine the position of his head using this information and other pieces of information to be described later.

Figure 16A:
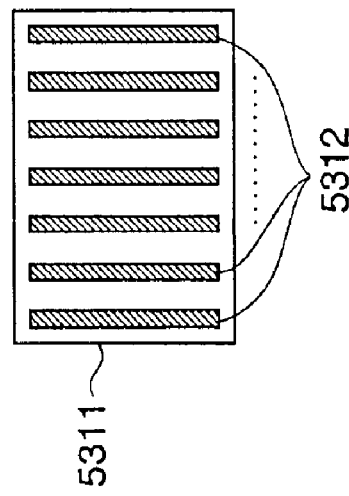
FIGS. 16A, 16B and 16C are diagrams showing other embodiments of a pressure-sensitive sheet member of the head detector.
Figure 16B:
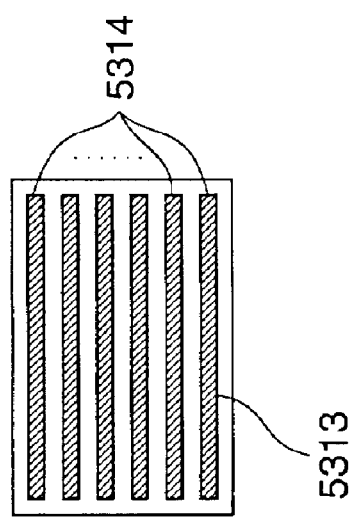
Figure 16C:
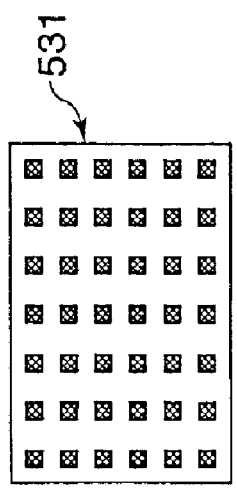

A sheet member basically fabricated by the principle of (4) using the material of (4) is adopted as the pressure-sensitive sheet member 531. Specifically, elongated pressure-sensitive conductive ink portions 5312 are arrayed at specified intervals in longitudinal direction on the rear surface of one film base 5311 as shown in FIG. 16A, whereas elongated pressure-sensitive conductive ink portions 5314 are arrayed at specified intervals in lateral direction on the rear surface of the other film base 5313 as shown in FIG. 16B. A film member 531 having pressure-sensitive portions in a matrix arrangement as shown in FIG. 16C can be fabricated as shown by adhering the rear surfaces of the both film bases 5311, 5313 together. For example, a specified voltage is successively applied at a high speed to lead wires of the respective pressure-sensitive conductive ink portions 5312 of the one film base 5311 and a voltage detecting circuit is connected with lead wires of the respective pressure-sensitive conductive ink portions 5314 of the other film base 5313. The positions of the feet on the pressure-sensitive sheet member 531 can be specified based on an application timing of the voltage to the pressure-sensitive conductive ink portions 5312 and the pressure-sensitive conductive ink portions 5314 detected to have been pressed by the voltage detecting circuit and their level can be detected. If such a pressure-sensitive sheet member 531 is used, the positions of both feet of the game player can be detected in a two-dimensional manner in transverse direction and forward and backward directions. In this embodiment, the three-dimensional position of the head of the game player standing on the pressure-sensitive sheet member 531 if the position detector 433 shown in FIG. 15 is adopted and the position determining device 433*g* is provided with a function of determining a position in the two-dimensional space.

Since the three-dimensional position of the game player's head can be determined in this way, the viewing point in the game space can also be moved in depth direction on the screen of the monitor 11.

(6) If the pressure-sensitive sheet member of (4) shown in FIG. 15 in which the pressure-sensitive conductive ink portions are arranged side by side in forward and backward directions is provided in addition to the head detector 130 of the second embodiment or the head detector of (1) to (3), the three-dimensional position of the game player's head can be specified as a whole since the position of the game player's head in depth direction can be specified by this pressure-sensitive sheet member.

(7) In the first embodiment, the ultrasonic receivers 32, 33 are arranged in positions located on a straight line at the left and right sides of the ultrasonic transmitter 31 to detect the height position and the transverse position of the game player's head. Instead, three ultrasonic receivers may be arranged in three positions on a horizontal plane where an ultrasonic transmitter is located, three ellipses may be determined based on periods measured by the respective ultrasonic receivers, i.e. distance information, and an intersection of these three ellipses may be detected as the position of the game player's head. This arrangement has an advantage of detecting the position of the head in the 3D space. It is sufficient to provide at least three ultrasonic receivers. Although ultrasonic waves are used as propagation mediums in the main embodiment and the embodiment (3), light, particularly infrared rays may be used instead.

(8) Although the loudspeakers 12 and the loudspeaker 21 are arranged at upper and lower positions in order to make the former more distant than the latter from the game player in the foregoing embodiment, the arrangement is not limited thereto. One or two loudspeakers 21 may be arranged in the transverse center and the loudspeakers 12 may be arranged on the opposite outer sides thereof. Alternatively, they may be arranged so that the loudspeakers 12 are located more distant than the loudspeaker 12 in depth direction. Further, although the loudspeakers 21, 12 are selectively used according to the distance of the sound-making object from the viewing point of the simulated camera or the game player, a great deal of acoustic presence can be obtained by at least causing sound effects and the like to be outputted from sound generators arranged in different positions to conform to the distance of the sound-making object from the viewing point of the simulated camera.

(9) Although the present invention is applied to the shooting game in the foregoing embodiments, it may be applied to other types of fighting games in which a game player fights with other character(s). For example, a game medium simulating a projectile weapon may be adopted. Further, the present invention is also applicable to, for example, fighting games (with bare hands or with gloves) such as a boxing game.

As described above, according to the present invention, an acoustic presence can be given since the output positions of the sound effects are switched according to the distance of the sound-making objects from the viewing point of the simulated camera.

Further, the hitting sound is outputted from the more distant first sound generator when the bullet hits the obstacle before the viewing point of the simulated camera while a sound of the bullet hurtling through the air is outputted from the nearer second sound generator when the bullet passes right beside the viewing point of the simulated camera. Such an arrangement is preferable for the shooting game.

Furthermore, the hitting sound is outputted from the first sound generator when the bullet hits the obstacle located at a distance before the viewing point of the simulated camera while a sound of the bullet hurtling through the air is outputted from the second sound generator when the bullet hits the object displayed right before the viewing point of the simulated camera. Such an arrangement is preferable for the shooting game.

Further, since a sound effect in conformity with the shooting result can be outputted, a better presence can be given.

Furthermore, the first and second sound generators can be preferably set at the distant and near positions from the position of the game player.

This application is based on Japanese Patent Application Serial No. 2000-245253 filed in Japanese Patent Office on Aug. 11, 2000, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A fighting video game machine wherein an enemy character appearing in a game image is displayed at an attacking position from a viewing point of a simulated camera on a monitor launching an attack, said fighting video game machine comprising:
   a detecting unit arranged to detect the position of the viewing point in a play area in front of and apart from the monitor,
   a game control unit for controlling the progress of the game,
   a display control unit for generating a three-dimensional image including the enemy character viewed from the viewing point of the simulated camera and displaying it on the monitor,
   a first sound generator and a second sound generator arranged in different positions to produce sound output based on the enemy character,
   a sound control unit for controlling a sound output from the first and second sound generators based on the enemy character, and
   attacking position judging means arranged to determine whether a distance between a calculated trajectory of a bullet fired by the enemy character displayed on the monitor at the attacking position and the viewing point of the simulated camera is less than or greater than a threshold distance value,
   wherein the sound control unit is coupled to said attacking position judging means and arranged to cause a sound to be outputted from the first sound generator when the distance between the calculated trajectory of the fired bullet and the viewing point is determined by the attacking position judging means to be greater than the threshold value and to cause the sound to be outputted from the second sound generator when the distance is determined by the attacking position judging means to be less than the threshold value.

2. A fighting video game machine according to claim 1, wherein the first sound generator is arranged in a position distant from the play area and the second sound generator is arranged in a position proximate to the play area.

3. A fighting video game machine according to claim 1, wherein the attack is shooting, the sound control unit causes a hitting sound to be outputted from the first sound generator when the attacking position judging means determines that the fired bullet has hit an obstacle displayed before the viewing point of the simulated camera while causing a sound hurtling through the air to be outputted from the second sound generator when the attacking position judging means determines that the fired bullet has passed beside the viewing point of the simulated camera.

4. A fighting video game machine according to claim 3, wherein the attacking position judging means is arranged to determine that the bullet has hit the viewing point of the simulated camera, and the sound control unit causes a target-hitting sound to be outputted from the second sound generator when the attacking position judging means makes such a determination.

5. A fighting video game machine according to claim 1, wherein the attack is shooting, the sound control unit causes a hitting sound to be outputted from the first sound generator when the attacking position judging means determines that the fired bullet has hit an obstacle displayed at a distance before the viewing point of the simulated camera while causing a hitting sound to be outputted from the second sound generator when the attacking position judging means determines that the fired bullet has hit an obstacle displayed right before the viewing point of the simulated camera.

6. A fighting video game machine according to claim 1, wherein the detecting unit comprises a head detecting unit arranged to detect a position of the head of a game player in the play area along a left-right direction of said fighting video game machine such that the head detecting unit detects the position of the game player's head during linear movement of the game player.

7. A fighting video game machine according to claim 6, wherein the second sound generator includes two loudspeakers provided at different respective positions along the left-right direction of the fighting video game machine.

8. A fighting video game machine according to claim 7, wherein the sound control unit controls the outputted sound volumes of the loudspeakers depending upon the detected position of a head of the player along the left-right direction.

9. A fighting video game machine according to claim 6, further comprising an image control unit for performing calculation of coordinates of the enemy characters when viewed from the viewing point of the simulated camera.

10. A fighting video game machine according to claim 9, wherein a head position detected by the head detecting unit is transmitted to the game control unit as viewing point information of the simulated camera so that the viewing point of the simulated camera is changed as to correspond to the position of the game player's head.

11. A fighting video game machine according to claim 10, wherein the viewing point of the simulated camera substantially coincides with the eyes of the game player.

12. A fighting video game machine according to claim 6, wherein a head position detected by the head detecting unit is transmitted to the game control unit as viewing point information of the simulated camera so that the viewing point of the simulated camera is changed to correspond to the position of the game player's head.

13. A fighting video game machine according to claim 1, wherein the first sound generator is arranged at a position higher than the monitor while the second sound generator is arranged at a position lower than the monitor.

14. A fighting video game machine according to claim 1, wherein the first sound generator includes a single loudspeaker provided substantially at a central position along a left-right direction of said fighting video game machine and the second sound generator includes a pair of loudspeakers provided above the monitor and left and right sides of the monitor, respectively.

15. A fighting video game machine according to claim 1, wherein the detecting unit comprises a head detecting unit which is arranged to transmit waves into an area occupied by the game player while playing the video game machine and receive waves reflected by the game player and determine the position of the head of the game player based on the received waves.

16. A fighting video game machine according to claim 1, wherein the detecting unit comprises a head detecting unit which is arranged to periodically detect the position of the head of the game player while allowing linear movement of the game player in a left-right direction of the video game machine.

17. A fighting video game machine according to claim 1, wherein the detecting unit comprises a head detecting unit arranged to detect a position of the head of a game player in the play area relative to the monitor and along a left-right direction of said fighting video game machine such that the head detecting unit detects the position of the game player's head during linear movement of the game player relative to the monitor.

18. A fighting video game machine wherein an enemy character appearing in a game image is displayed at an attacking position from a viewing point of a simulated camera on a monitor launching an attack, said fighting video game machine comprising:

a detecting unit for detecting the position of the viewing point in a play area in front of and apart from the monitor, a display control unit for generating a three-dimensional image including the enemy character viewed from the viewing point of the simulated camera and displaying it on the monitor, a first sound generator arranged at a first position for outputting the sound based on the enemy character;

a second sound generator arranged at a second position for outputting the sound in accordance with the based on the enemy character, said first position being more distant from the play area than the second position, a sound control unit for controlling an output of a sound from the first and second sound generators according to an attacking position of the enemy character, and attacking position judging means arranged to determine whether a distance between an attacked position by the attack of the enemy character displayed on the monitor and the viewing point of the simulated camera is less than or greater than a threshold distance value, wherein the sound control unit is coupled to said attacking position judging means and arranged to cause a sound to be outputted from the first sound generator when the distance is greater than the threshold distance value and to cause a sound to be outputted from the second sound generator when the distance is less than the threshold distance value.

19. A fighting video game machine wherein an enemy character appearing in a game image is displayed at an attacking position from a viewing point of a simulated camera on a monitor launching an attack, the viewing point being situated in front of and apart from the monitor, said fighting video game machine comprising:

a game control unit for controlling progress of the game, an image control unit for performing calculation of coordinates of the enemy characters when viewed from the viewing point of the simulated camera;

a head detecting unit arranged to detect a position of a head of a game player in the play area along a left-right direction of said fighting video game machine such that the head detecting unit detects the position of the game player's head during linear movement of the game player; a head position detected by the head detector is transmitted to the game control unit as viewing point information of the simulated camera so that the viewing point of the simulated camera is changed as to correspond to the position of the game player's head;

a first sound generator provided at a first position for outputting the sound in accordance with the attacking position;

a second sound generator provided at a second position for outputting the sound in accordance with the attacking position; said first position being more distant from the play area than the second position, a sound control unit for controlling an output of a sound from the first and second sound generators according to an attacking position of the enemy character, and attacking position judging means for determining whether a distance between an attacked position by the attack of the enemy character displayed on the monitor and the viewing point of the simulated camera is less than or greater than a threshold distance value, wherein the sound control unit is coupled to the attacking position judging means and arranged to cause a sound to be outputted from the first sound generator when the distance is greater than the threshold distance value and to cause a sound to be outputted from the second sound generator when the distance is less than the threshold distance value.

20. A fighting video game machine according to claim 19, wherein the head detecting unit is arranged to detect the position of the head of a game player in the play area relative to the monitor such that the head detecting unit detects the position of the game player's head during linear movement of the game player relative to the monitor.

* * * * *